United States Patent
Nakagawa et al.

(10) Patent No.: US 8,179,206 B2
(45) Date of Patent: May 15, 2012

(54) LOW-VOLTAGE CONTROL HIGH-FREQUENCY SWITCH AND COMPOSITE HIGH-FREQUENCY COMPONENT

(75) Inventors: Dai Nakagawa, Moriyama (JP); Naoki Nakayama, Sakai (JP)

(73) Assignee: Murata Manufacturing Co., Ltd., Kyoto (JP)

( * ) Notice: Subject to any disclaimer, the term of this patent is extended or adjusted under 35 U.S.C. 154(b) by 723 days.

(21) Appl. No.: 12/203,991

(22) Filed: Sep. 4, 2008

(65) Prior Publication Data

US 2008/0310382 A1 Dec. 18, 2008

Related U.S. Application Data

(63) Continuation of application No. PCT/JP2007/056360, filed on Mar. 27, 2007.

(30) Foreign Application Priority Data

Apr. 5, 2006 (JP) ................................. 2006-104159

(51) Int. Cl.
*H01P 1/15* (2006.01)
*H04B 1/44* (2006.01)
(52) U.S. Cl. ......................................... 333/103; 455/78
(58) Field of Classification Search .................. 333/101, 333/103; 455/78; 370/357
See application file for complete search history.

(56) References Cited

U.S. PATENT DOCUMENTS

| | | | |
|---|---|---|---|
| 5,054,114 A | * | 10/1991 | Erickson .................... 455/78 |
| 6,442,376 B1 | | 8/2002 | Furutani et al. |
| 7,356,349 B2 | | 4/2008 | Furutani et al. |
| 7,522,015 B2 | * | 4/2009 | Oikawa et al. ............... 333/103 |
| 7,852,220 B2 | * | 12/2010 | Uejima ....................... 340/572.1 |
| 2002/0127973 A1 | | 9/2002 | Furutani et al. |

FOREIGN PATENT DOCUMENTS

| | | |
|---|---|---|
| EP | 1492245 A1 | 12/2004 |
| JP | 62-68324 U | 4/1987 |
| JP | 4-116441 U | 10/1992 |
| JP | 2003-018040 A | 1/2003 |
| JP | 2004-128799 A | 4/2004 |
| JP | 2005-244860 A | 9/2005 |
| WO | 2005/046070 A1 | 5/2005 |

OTHER PUBLICATIONS

Official Communication issued in corresponding British Patent Application No. GB0817065.6, mailed on Dec. 8, 2010.
Official Communication issued in International Patent Application No. PCT/JP2007/056360, mailed on Jun. 19, 2007.
Official Communication issued in corresponding Chinese Patent Application No. 200780012470.8, mailed Jul. 26, 2011.
Official Communication issued in corresponding Japanese Patent Application No. 2008-508538, mailed on Jul. 20, 2010.

* cited by examiner

*Primary Examiner* — Dean O Takaoka
(74) *Attorney, Agent, or Firm* — Keating & Bennett, LLP

(57) ABSTRACT

In a transmission/reception selection switch, a first diode is arranged in series with a transmission signal line and a second diode is arranged in shunt with a reception signal line. A first current route where a direct current passes through the first diode is connected in parallel to a second current route where a direct current passes through the second diode. When a predetermined positive voltage is applied to a control terminal, the diodes are turned ON and a direct current flows through, in order, the control terminal, a resistor, an inductor, the diode, a strip line, and an inductor), and a direct current flows through, in order, the control terminal, the resistor, the second diode, and the inductor.

18 Claims, 18 Drawing Sheets

LOW-VOLTAGE CONTROL HIGH-FREQUENCY SWITCH AND COMPOSITE HIGH-FREQUENCY COMPONENT

BACKGROUND OF THE INVENTION

1. Field of the Invention

The present invention relates to a high-frequency switch and a composite high-frequency component that includes the high-frequency switch. In particular, the present invention relates to a low-voltage control high-frequency switch that switches between transmission/reception signals with a low control voltage and to a composite high-frequency component.

2. Description of the Related Art

A known high-frequency switch transmits/receives transmission/reception signals of a plurality of communication systems in different frequency bands through an antenna and switches the transmission/reception signals to a transmission signal and a reception signal. A known composite high-frequency component includes such a high-frequency switch.

The high-frequency switch includes a plurality of diodes arranged to output a transmission signal to the antenna and input a reception signal received from the antenna into a reception portion (see, for example, Japanese Unexamined Patent Application Publication No. 2000-165274).

The configuration of a composite high-frequency component shown in Japanese Unexamined Patent Application Publication No. 2000-165274 is described below with reference to FIG. 1.

The composite high-frequency component supports GSM1800 (DCS) in the 1800 MHz range, GSM1900 (PCS) in the 1900 MHz range, GSM850 in the 850 MHz range, and GSM900 (EGSM) in the 900 MHz range.

In FIG. 1, a diplexer (multiplexer/demultiplexer) 102 multiplexes or demultiplexes a transmission/reception signal of the GSM850/GSM900 system and a transmission/reception signal of the GSM1800/GSM1900 system. A transmission/reception selection switch 103 switches between a transmission signal and a reception signal of the GSM850/GSM900 system. Similarly, a transmission/reception selection switch 104 switches between a transmission signal and a reception signal of the GSM1800/GSM1900 system. A filter 105 allows the fundamental of a transmission signal of the GSM850/GSM900 system to pass therethrough and attenuates the harmonic. Similarly, a filter 106 allows the fundamental of a transmission signal of the GSM1800/GSM1900 system to pass therethrough and attenuates the harmonic.

In the transmission/reception selection switch 103, a diode GD1 and an inductor GSL1 are arranged in a transmission line through which a transmission signal of the GSM850/900 system is transmitted, and the diode GD1 is arranged in series with this transmission line. A strip line GSL2, a diode GD2, and a capacitor GC5 are arranged in a transmission line through which a reception signal of the GSM850/900 system is transmitted, and the diode GD2 is arranged in shunt with this transmission line. The two diodes GD1 and GD2 are connected in series such that, when a positive voltage is applied from a terminal VcG arranged to transmit a transmission/reception selection control signal, a direct current passes through the diodes GD1 and GD2.

Similarly, in the transmission/reception selection switch 104, a diode DD1 and an inductor DPSL1 are arranged in a transmission line through which a transmission signal of the GSM1800/1900 system is transmitted, and the diode DD1 is arranged in series with this transmission line. A strip line DSL2, a diode DD2, and a capacitor DC5 are arranged in a transmission line through which a reception signal of the GSM1800/1900 system is transmitted, and the diode DD2 is arranged in shunt with this transmission line. The two diodes DD1 and DD2 are connected in series such that, when a positive voltage is applied from a terminal VcD arranged to transmit a transmission/reception selection control signal, a direct current passes through the diodes DD1 and DD2.

The composite high-frequency component described above is used in a communication device in a mobile communication system, such as a mobile telephone terminal, and the driving voltage is reduced due to a recent demand for power saving. However, when a voltage in a known transmission/reception selection switch (high-frequency switch) illustrated in FIG. 1 is reduced, a voltage applied between the anode and cathode of the two diodes (for example, the diodes GD1 and GD2 in the transmission/reception selection switch 103 for the GSM850/900 system illustrated in FIG. 1) approaches the PN junction potential of each of the diodes. Under such a condition, the diode is incompletely conducting, such that a phenomenon occurs in which ON resistance increases or a voltage between both ends of the diode varies in accordance with a voltage of a transmission signal to be transmitted/cut off. As a result, in terms of circuit characteristics, a problem arises in which an insertion loss (IL) and harmonic distortion increase. Consequently, there is a limit to the reduction in the control voltage.

The problems described above occur not only in the transmission/reception selection switch but also, for example, in a reception-signal selection switch that switches between reception signals of two communication systems using different frequency bands.

SUMMARY OF THE INVENTION

To overcome the problems described above, preferred embodiments of the present invention provide a low-voltage control high-frequency switch capable of switching using a control voltage that is less than that in a known high-frequency switch and capable of suppressing deterioration in insertion-loss characteristics and harmonic-distortion characteristics, and a composite high-frequency component that includes such a novel low-voltage control high-frequency switch.

A high-frequency switch and a composite high-frequency component according to a preferred embodiment of the present invention includes a first signal line arranged between a shared signal input/output portion and a first signal input/output portion and a second signal line arranged between the shared signal input/output portion and a second signal input/output portion. The high-frequency switch includes a first current route in which a direct current flows, the first current route including a first diode, and a second current route in which a direct current flows, the second current route including a second diode. The first and second current routes are connected in parallel at a parallel connection such that directions in which the direct currents flow in the first and second current routes substantially match each other, an inductor is arranged between a first node of the parallel connection and a ground, and a second node of the parallel connection defines a control-voltage input portion. The first diode is arranged in series with the first signal line, and the second diode is arranged in shunt with the second signal line.

A low-voltage control high-frequency switch according to another preferred embodiment of the present invention includes a first signal line arranged between a shared signal input/output portion and a first signal input/output portion and a second signal line arranged between the shared signal input/output portion and a second signal input/output portion. The high-frequency switch includes a first diode arranged in series with the first signal line, a second diode arranged in shunt with the second signal line, a first current route in which a direct current flows, the first current route including the first diode, a second current route in which a direct current flows, the second current route including the second diode, and a strip line arranged in the second signal line between the first diode and the second diode and between the shared signal input/output portion and the second diode. The first and second current routes are connected in parallel at a parallel connection such that directions in which the direct currents flow in the first and second current routes substantially match each other, an inductor is arranged closer to the second signal input/output portion than to the strip line and between a first node of the parallel connection and a ground, the first node being a node of the second diode and the strip line, and a second node of the parallel connection defines a control-voltage input portion.

Each of the first and second current routes is preferably provided with, for example, a resistor through which the direct current flows.

A composite high-frequency component according to a preferred embodiment of the present invention includes input/output portions for transmission/reception signals of a plurality of communication systems in different frequency bands and a multiplexer/demultiplexer that includes an antenna connection portion and that multiplexes or demultiplexes the transmission/reception signals of the plurality of communication systems. A high-frequency switch that switches between a transmission signal and a reception signal is connected between the multiplexer/demultiplexer and each of the input/output portions of the plurality of communication systems. At least one of the high-frequency switches is a low-voltage control high-frequency switch according to a preferred embodiment of the present invention.

The low-voltage control high-frequency switch is preferably arranged, for example, between the multiplexer/demultiplexer and an input/output portion of a communication system whose signal power is the highest among the transmission/reception signals of the plurality of communication systems.

Preferably, the composite high-frequency component may include, for example, a strip line arranged between the antenna connection portion of the multiplexer/demultiplexer and the low-voltage control high-frequency switch, a first end of the inductor of the low-voltage control high-frequency switch may preferably be connected to a node of the multiplexer/demultiplexer and the low-voltage control high-frequency switch, and a second end of the inductor may preferably be grounded.

Preferably, the multiplexer/demultiplexer may be partially shared by the inductor of the low-voltage control high-frequency switch and the first and second current routes, for example.

Preferably, the composite high-frequency component may further include, for example, a filter arranged to suppress distortion arranged between the low-voltage control high-frequency switch and the multiplexer/demultiplexer, the filter cutting off frequency components other than a frequency band used in a communication system selected by the low-voltage control high-frequency switch.

Preferably, the multiplexer/demultiplexer may multiplex or demultiplex a transmission/reception signal of two communication systems having adjacent frequency bands (e.g., GSM1800, 1900) and a transmission/reception signal of the other communication system(s) among transmission/reception signals (e.g., a transmission/reception signal of GSM850/900 and a transmission/reception signal of GSM1800/1900) of at least three communication systems (e.g., GSM850, 900/GSM1800/GSM1900), and a reception-signal high-frequency switch that switches between reception signals (e.g., GSM1800Rx and GSM1900Rx) of the two communication systems having adjacent frequency bands may be configured a low-voltage control high-frequency switch according to a preferred embodiment of the present invention. Thus, a triple-band composite high-frequency component may be provided, for example.

Preferably, the multiplexer/demultiplexer may, for example, multiplex or demultiplex a transmission/reception signal of a first group including two communication systems having adjacent frequency bands (e.g., GSM1800/1900) and a transmission/reception signal of a second group including two communication systems having adjacent frequency bands (e.g., GSM850/900) among four communication systems (e.g., GSM850/900/1800/1900), and at least one of a first reception-signal high-frequency switch that switches between reception signals (e.g., GSM1800Rx and GSM1900Rx) of the two communication systems of the first group and a second reception-signal high-frequency switch that switches between reception signals (e.g., GSM850Rx and GSM900Rx) of the two communication systems of the second group may be a low-voltage control high-frequency switch according to a preferred embodiment of the present invention. Thus, a quad-band composite high-frequency component may be provided, for example.

The first and second current routes are preferably connected in parallel at a parallel connection such that the directions in which the direct currents flow substantially match each other, the inductor is arranged between the first node of the parallel connection and the ground, and the control voltage is input into the second node of the parallel connection. Therefore, the control voltage is applied to each of the first and second diodes, and the control voltage used for on-and-off control can be a low voltage. That is, as compared to when two diodes that are connected in series receive a control voltage, as in the related art, the voltage applied to each of the diodes is increased. As a result, the control voltage can be reduced without degrading insertion loss and harmonic distortion.

The inductor arranged closer to the second signal input/output portion than to the strip line arranged between the shared signal input/output portion and the second diode is preferably arranged between the node of the second diode and the strip line and the ground. Therefore, even when the first diode is in an on state and the second diode is in an off state during switching of the first and second diodes as a result of a difference between switching speeds of the diodes, for example, the inductor equivalently grounds a signal in the first signal line prior to the second signal input/output portion. Thus, a signal in the first signal line can be prevented from leaking to the second signal input/output portion side.

The first and second current routes are preferably provided with respective resistors. Therefore, currents passing through the first and second diodes when the first and second diodes are in the on state can be independently set. Thus, the application of a minimum necessary voltage and the passage of a minimum necessary current can be performed while the overall power consumption is reduced.

In the composite high-frequency component according to preferred embodiments of the present invention including the multiplexer/demultiplexer that multiplexes or demultiplexes transmission/reception signals of the plurality of communication systems and the high-frequency switch that switches between transmission and reception, the high-frequency switch is a low-voltage control high-frequency switch according to a preferred embodiment of the present invention. Therefore, the low-voltage composite high-frequency component having low current consumption is obtained.

The low-voltage control high-frequency switch according to preferred embodiments of the present invention is arranged at least between the multiplexer/demultiplexer and an input/output portion of a communication system whose signal power is greatest among the transmission/reception signals of the plurality of communication systems. Therefore, deterioration in the harmonic-distortion characteristics of a transmission/reception signal that is sensitive to a reduction in voltage applied to the first and second diodes is minimized.

The strip line is preferably arranged between the antenna connection portion of the multiplexer/demultiplexer and the low-voltage control high-frequency switch, for example, and the inductor of the low-voltage control high-frequency switch is preferably arranged between the node of the multiplexer/demultiplexer and the low-voltage control high-frequency switch and the ground, for example. Therefore, the inductor provides a path to discharge static electricity input from the antenna terminal, such that a receiving circuit or a transmitting circuit connected to the low-voltage control high-frequency switch is protected from the static electricity.

The multiplexer/demultiplexer is preferably partially shared by the inductor of the low-voltage control high-frequency switch and the first and second current routes, for example. Therefore, the inductor provides a path to discharge static electricity input from the antenna terminal, such that a receiving circuit or transmitting circuit connected to the low-voltage control high-frequency switch is protected from the static electricity.

The filter that cuts off the frequency components other than the frequency band of a signal selected by the low-voltage control high-frequency switch is preferably arranged between the low-voltage control high-frequency switch and the multiplexer/demultiplexer, for example. Therefore, a harmonic content occurring in the low-voltage control high-frequency switch is removed, and correspondingly, the control voltage to be applied to the low-voltage control high-frequency switch can be further reduced.

Among transmission/reception signals of at least three communication systems, transmission/reception signals of two communication systems having adjacent frequency bands and transmission/reception signals of the other communication system(s) are multiplexed or demultiplexed by the multiplexer/demultiplexer, and the reception-signal high-frequency switch that switches between reception signals of the two communication systems having adjacent frequency bands is a low-voltage control high-frequency switch according to a preferred embodiment of the present invention. Therefore, the composite high-frequency component can be used as a triple-band switchplexer that inputs/outputs transmission/reception signals of three frequency bands and outputs reception signals of two frequency bands.

Among transmission/reception signals of four communication system, transmission/reception signals of a first group including two communication systems having adjacent frequency bands and transmission/reception signals of a second group including two communication systems having adjacent frequency bands are multiplexed or demultiplexed, and at least one of a first reception-signal high-frequency switch that switches between reception signals of the two communication systems of the first group and a second reception-signal high-frequency switch that switches between reception signals of the two communication systems of the second group is a low-voltage control high-frequency switch according to a preferred embodiment of the present invention. Therefore, the composite high-frequency component can be used as a quad-band switchplexer that inputs a transmission signal and outputs a reception signal of four communication systems.

Other features, elements, steps, characteristics and advantages of the present invention will become more apparent from the following detailed description of preferred embodiments of the present invention with reference to the attached drawings.

DETAILED DESCRIPTION OF THE PREFERRED EMBODIMENTS

First Preferred Embodiment

A transmission/reception selection switch according to a first preferred embodiment of the present invention will be described with reference to FIG. 2.

Figure 2:
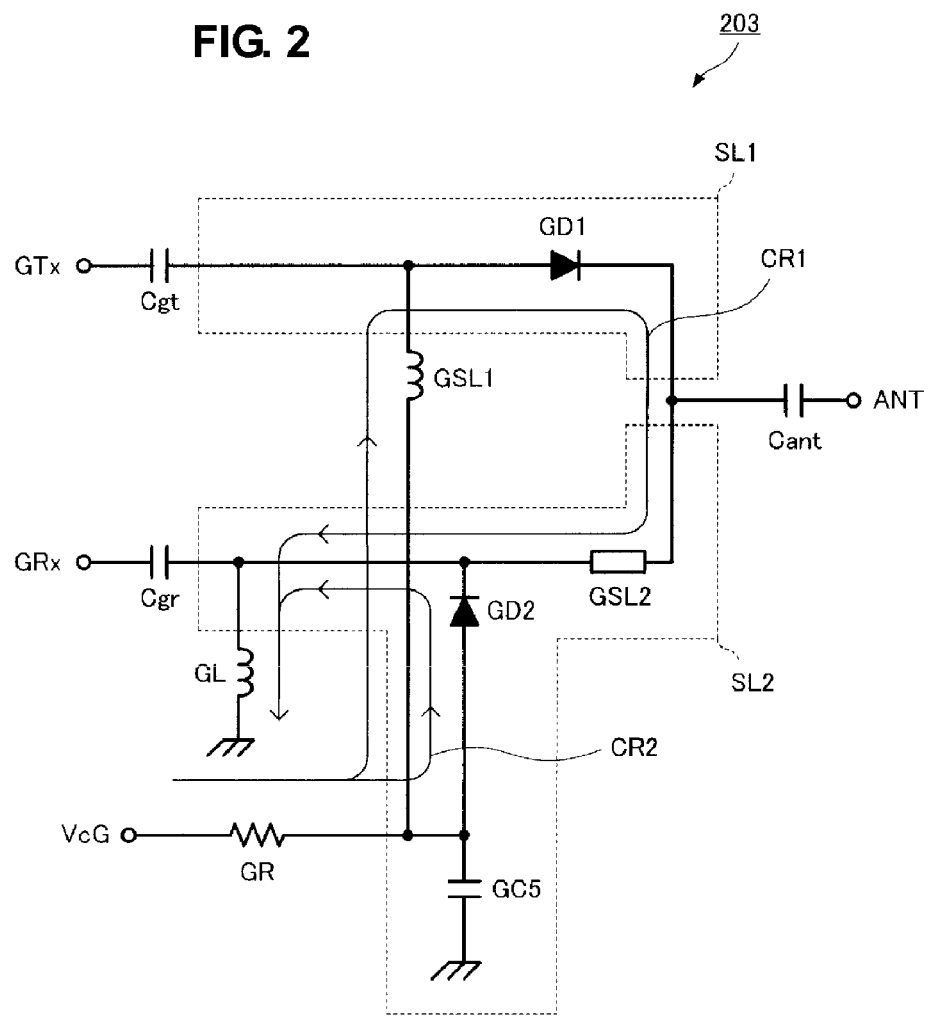
FIG. 2 is a circuit diagram of a low-voltage control high-frequency switch according to a first preferred embodiment of the present invention.

FIG. 2 is a circuit diagram of a transmission/reception selection switch in which a low-voltage control high-frequency switch according to the first preferred embodiment of the present invention is used. The transmission/reception selection switch 203 switches between outputting a transmission signal input into a terminal GTx from a transmission circuit to an antenna terminal ANT and outputting a reception signal received from the antenna terminal ANT to a reception terminal GRx in accordance with an applied voltage from a control terminal VcG.

As illustrated in FIG. 2, a first diode GD1 is arranged in series with a first signal line SL1, and a second diode GD2 is arranged in shunt with a second signal line SL2 via a capacitor GC5. The first signal line SL1 is arranged between the antenna terminal ANT defining a shared signal input/output portion and the terminal GTx defining a first signal input/output portion. The second signal line SL2 is arranged between the antenna terminal ANT and the terminal GRx defining a second signal input/output portion. In addition, a first current route CR1 including the first diode GD1 and a second current route CR2 including the second diode GD2 are provided. The first current route CR1 and the second current route CR2 are connected in parallel at a parallel connection with each other such that the directions in which the direct currents pass therethrough substantially match each other. An inductor GL is arranged between a ground and a first node of the parallel connection, and the control terminal VcG defining a control-voltage input portion is connected to a second node of the parallel connection via a resistor GR.

With this configuration, when a positive voltage is applied to the control terminal VcG, both the first diode GD1 and the second diode GD2 are turned ON and a direct current flows through each of the first current route CR1 and the second current route CR2 in the direction of the arrows in FIG. 2.

When the first diode GD1 is turned ON, a transmission signal from the terminal GTx passes through the first signal line SL1 and is output to the antenna terminal ANT via a capacitor Cant. When the second diode GD2 is turned ON, the second signal line SL2 is shunted by the second diode GD2 and the capacitor GC5, and thus, a transmission signal is not output to the terminal GRx.

The electrical length of a strip line GSL2 is determined such that, when the second diode GD2 is in an on state, a node of the first signal line SL1 and the second signal line SL2 is equivalently open.

An inductor GSL1 is arranged in a path between the anode of the first diode GD1 and a node of the resistor GR and the capacitor GC5. The inductor GSL1 prevents a transmission signal from the terminal GTx from being grounded through the path between the node of the resistor GR and the capacitor GC5 and the anode of the first diode GD1 and the capacitor GC5. Instead of the inductor GSL1, a resistor may be provided to produce similar advantages.

Each of a capacitor Cgt arranged in the first signal line SL1, a capacitor Cgr arranged in the second signal line SL2, and the capacitor Cant connected to the antenna terminal ANT is a capacitor arranged to block direct current and to match impedance.

The capacitor GC5 connected in series with the second diode GD2 functions such that, when the second diode GD2 is in the on state, a signal is grounded in a high-frequency manner and a direct current does not become short circuited to the ground.

Figure 1:
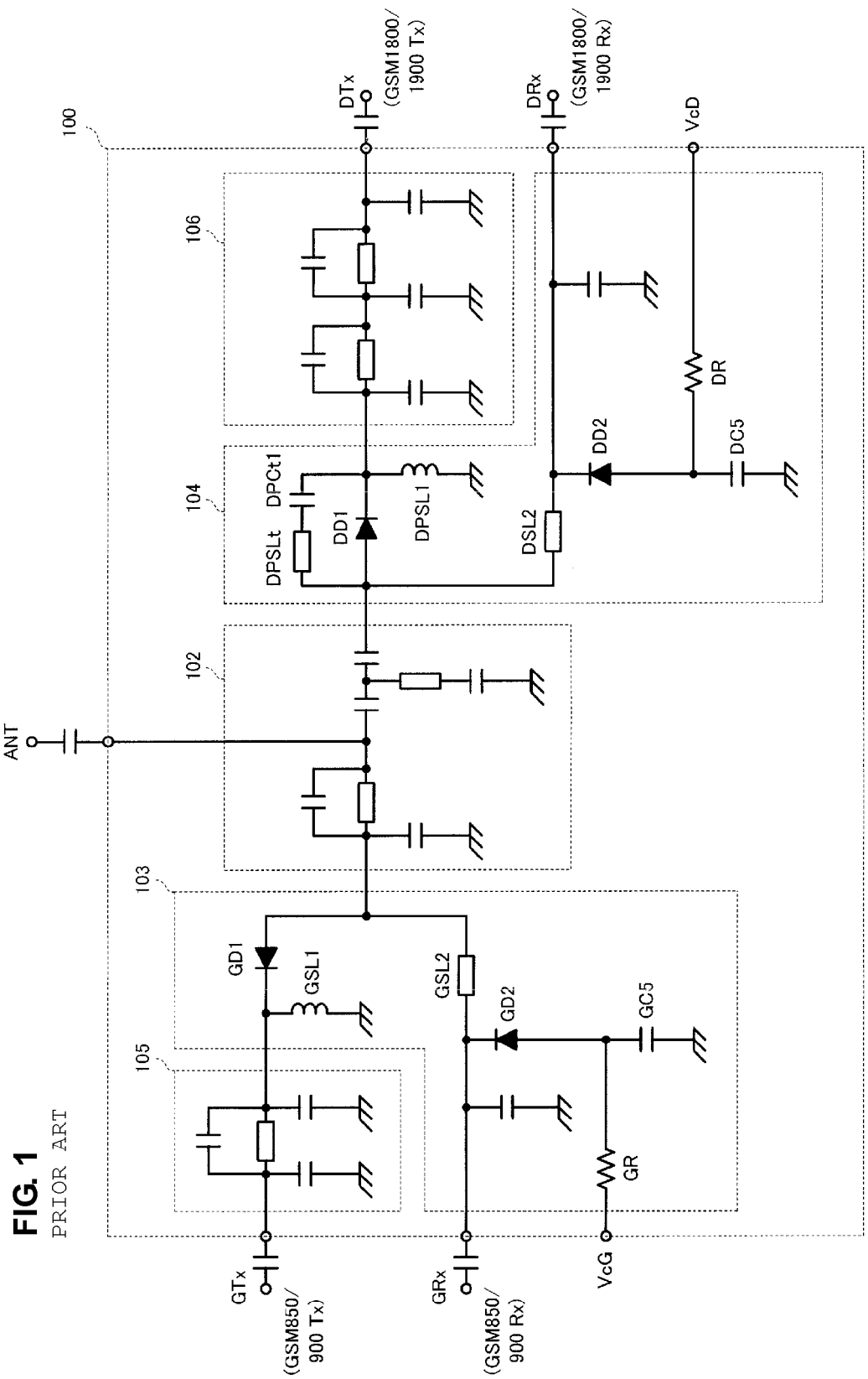
FIG. 1 is an illustration that shows a configuration of a known composite high-frequency component.

In this manner, by connecting the first current route CR1 and the second current route CR2 in parallel and by applying a voltage from the control terminal VcG to each of the first diode GD1 and the second diode GD2, the voltage applied to each of the first diode GD1 and the second diode GD2 is greater than that in the known high-frequency switch illustrated in FIG. 1, and accordingly, a control voltage to be applied to the control terminal VcG can be set to a lower value. For example, about 2.4 V to about 2.8 V or about 2.3 V to about 3.0 V is used as the control voltage in a known art, whereas the control voltage in the circuitry illustrated in FIG. 2 can be preferably set at a low level of about 1.6 V to about 2.0 V, for example.

In FIG. 2, when the first diode GD1 and the second diode GD2 are in the on state, a transmission signal is input from the terminal GTx. The strip line GSL2 has an electrical length approximately equivalent to a quarter wavelength of the frequency of the transmission signal. Therefore, when the second diode GD2 is in the on state, a side of the strip line GSL2 adjacent to the antenna terminal ANT defining a shared signal input/output portion is equivalently open, so the majority of the above transmission signal is cut off by the strip line GSL2. Even leakage of the signal is grounded via the second diode GD2 and the capacitor GC5 due to the ON state of the second diode GD2, such that the transmission signal does not leak into the terminal GRx.

However, during switching of the first and second diodes GD1 and GD2, due to the difference between switching speeds of the diodes, there may be a period of time in which the first diode GD1 is in the on state and the second diode GD2 is in an off state. At this time, the leakage of the transmission signal from the strip line GSL2 leaks to the terminal GRx side. If the signal leakage is input to a receiving circuit connected downstream of the terminal GRx, such as a low-noise amplifier (LNA), the receiving circuit may be damaged or destroyed.

However, in the circuitry illustrated in FIG. 2, the inductor GL is arranged in shunt prior to the terminal GRx, and the inductor GL has an inductance value at which it is equivalently grounded with respect to the frequency of the transmission signal. For example, when it is defined by a line, the electrical length of the line is preferably set at approximately $\lambda/2$ of the transmission signal, and the leakage of the transmission signal is grounded by the inductor GL.

The arrangement of the inductor GL prevents a circuit adjacent to the terminal Rx from being damaged or destroyed by a transmission signal leaking to the terminal GRx side resulting from the difference between switching speeds of the first and second diodes GD1 and GD2.

Second Preferred Embodiment

A composite high-frequency component according to a second preferred embodiment of the present invention will be described with reference to FIG. 3.

Figure 3:
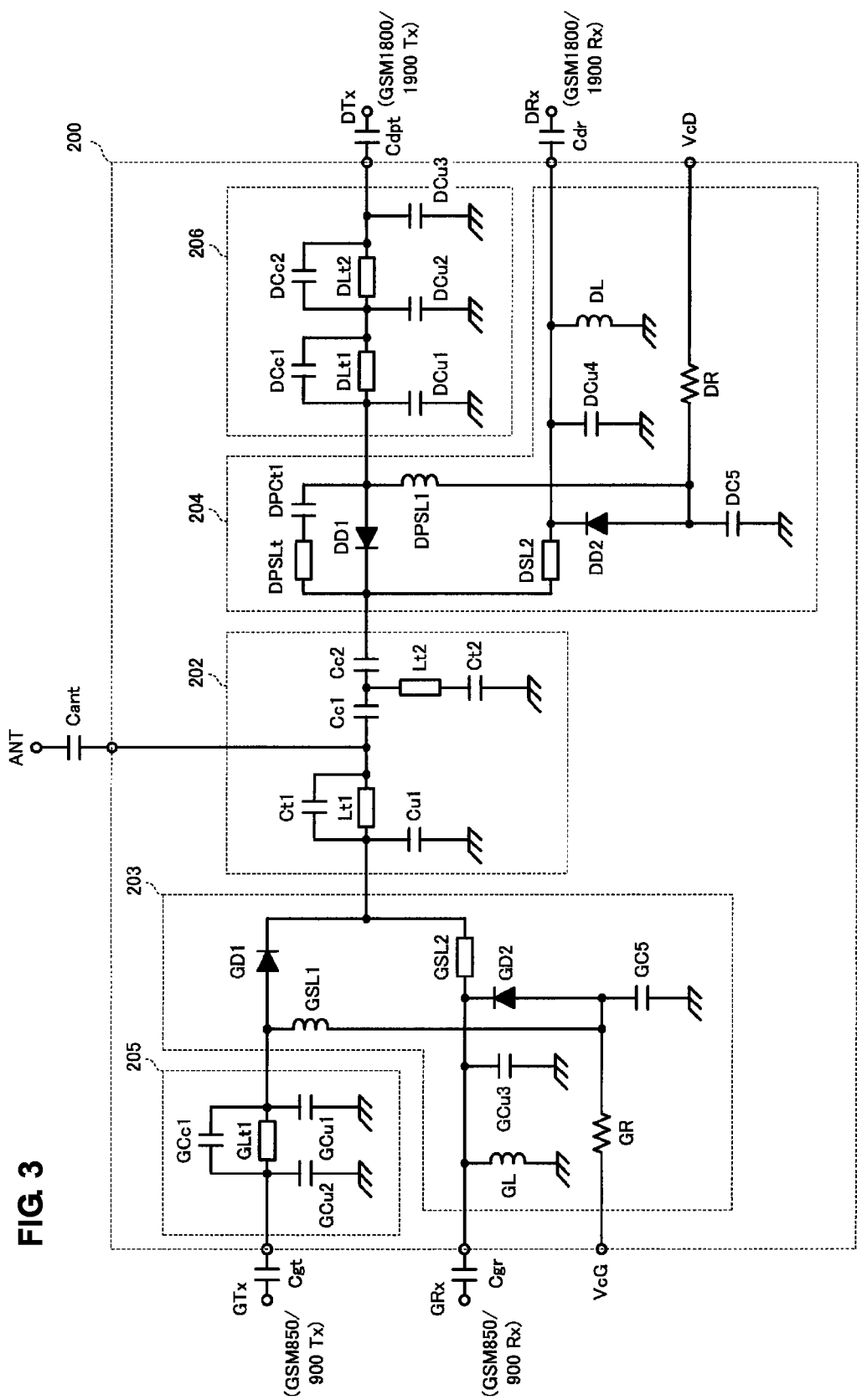
FIG. 3 is a circuit diagram of a composite high-frequency component according to a second preferred embodiment of the present invention.

A composite high-frequency component 200 illustrated in FIG. 3 supports GSM1800 (DCS) in the 1800 MHz range, GSM1900 (PCS) in the 1900 MHz range, GSM850 in the 850 MHz range, and GSM900 (EGSM) in the 900 MHz range.

In FIG. 3, a diplexer 202 multiplexes or demultiplexes a transmission/reception signal of the GSM850/GSM900 system and a transmission/reception signal of the GSM1800/

GSM1900 system. A transmission/reception selection switch 203 switches between a transmission signal and a reception signal of the GSM850/GSM900 system. Similarly, a transmission/reception selection switch 204 switches between a transmission signal and a reception signal of the GSM1800/GSM1900 system. A filter 205 allows a transmission signal of the GSM850/GSM900 system to pass therethrough and attenuates the harmonic. Similarly, a filter 206 allows a transmission signal of the GSM1800/GSM1900 system to pass therethrough and attenuates the harmonic.

A difference from the known composite high-frequency component illustrated in FIG. 1 and this preferred embodiment of the present invention is the arrangement of each of the transmission/reception selection switches 203 and 204. The diplexer 202 illustrated in FIG. 3 is substantially the same as that of the diplexer 102 illustrated in FIG. 1. Capacitors Ct1 and Cu1 and a strip line Lt1 define a low-pass filter. Capacitors Cc1, Cc2, and Ct2 and a strip line Lt2 define a high-pass filter.

The filter 205 illustrated in FIG. 3 is substantially the same as the filter 105 illustrated in FIG. 1. In this example, capacitors GCc1, Gcu1, and GCu2 and a strip line GLt1 define a low-pass filter.

The filter 206 illustrated in FIG. 3 is substantially the same as the filter 106 illustrated in FIG. 1. Capacitors DCc1, DCc2, DCu1, DCu2, and DCu3 and strip lines DLt1 and DLt2 define a low-pass filter.

The arrangement of the transmission/reception selection switch 203 illustrated in FIG. 3 preferably is substantially the same as that of the transmission/reception selection switch 203 illustrated in FIG. 2. That is, a first diode GD1 is arranged in series with a transmission signal line for the GSM850/900 system, and a second diode GD2 and a capacitor GC5 are arranged in shunt with a reception signal line. A first current route through which a direct current flows includes, in order, a control terminal VcG, a resistor GR, an inductor GSL1, the first diode GD1, a strip line GSL2, and an inductor GL. A second current route through which a direct current flows includes, in order, the control terminal VcG, the resistor GR, the second diode GD2, and the inductor GL. The first current route including the first diode GD1 and the second current route including the second diode GD2 are connected in parallel.

A capacitor GCu3 is arranged in the reception signal line for the GSM850/900 system and is a capacitor arranged to match impedance of the reception signal line when the second diode GD2 is in the off state.

The arrangement of the transmission/reception selection switch 204 for the GSM1800/1900 system is preferably substantially the same as that of the transmission/reception selection switch 203 for the GSM850/900 system. A first diode DD1 is arranged in series with a transmission signal line for the GSM1800/1900 system. A second diode DD2 is arranged in shunt with a reception signal line for the GSM1800/1900 system.

However, the transmission/reception selection switch 204 is different from the transmission/reception selection switch 203 in that a series circuit including a strip line DPSLt and a capacitor DPCt1 is connected in parallel with the first diode DD1. The strip line DPSLt is provided to ensure isolation using parallel resonance of the capacitance of the diode DD1 and the strip line DPSLt when the diode DD1 is in the off state. The capacitor DPCt1 is provided to prevent a direct current from flowing without passing through the diode DD1.

When a predetermined positive voltage is applied to a control terminal VcD of the transmission/reception selection switch 204, the first diode DD1 is turned ON and a direct current flows through, in order, the control terminal VcD, a resistor DR, an inductor DPSL1, the diode DD1, a strip line DSL2, and an inductor DL. The second diode DD2 is turned ON and a direct current flows through, in order, the control terminal VcD, the resistor DR, the diode DD2, and the inductor DL.

A capacitor DCu4 is a capacitor arranged to match impedance of the reception signal line when the diode DD2 is in the off state.

In this manner, both switching between transmission and reception for the GSM850/900 system and switching between transmission and reception for the GSM1800/1900 system can be controlled with a low voltage.

An example when the composite high-frequency component is integrally provided in a multilayer substrate including laminated ceramic sheet layers will be described with reference to FIGS. 4 to 6.

Figure 4:
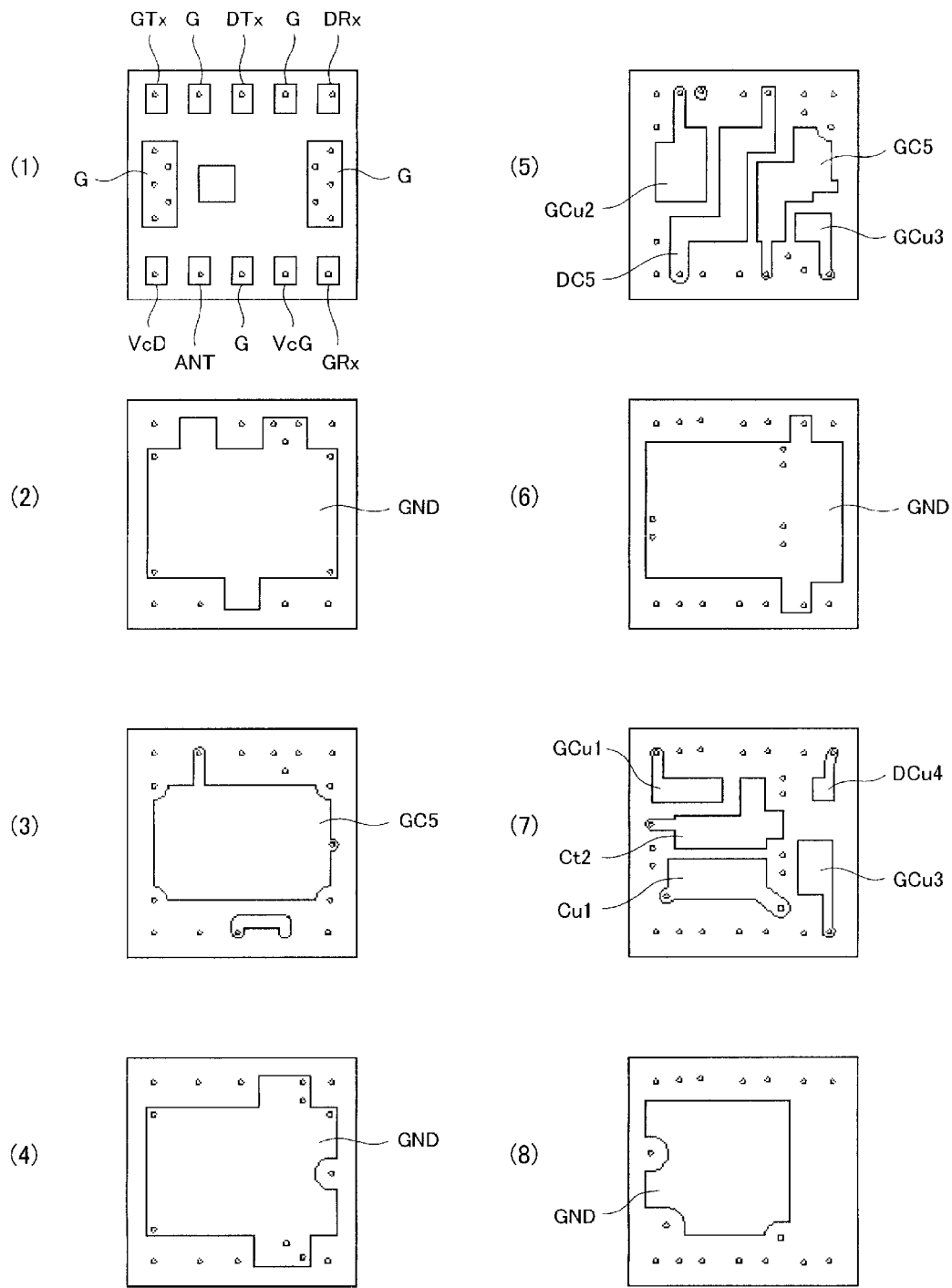
FIG. 4 illustrates a conductor pattern of each layer when the composite high-frequency component includes a multilayer substrate in which ceramic sheet layers are laminated.
Figure 5:
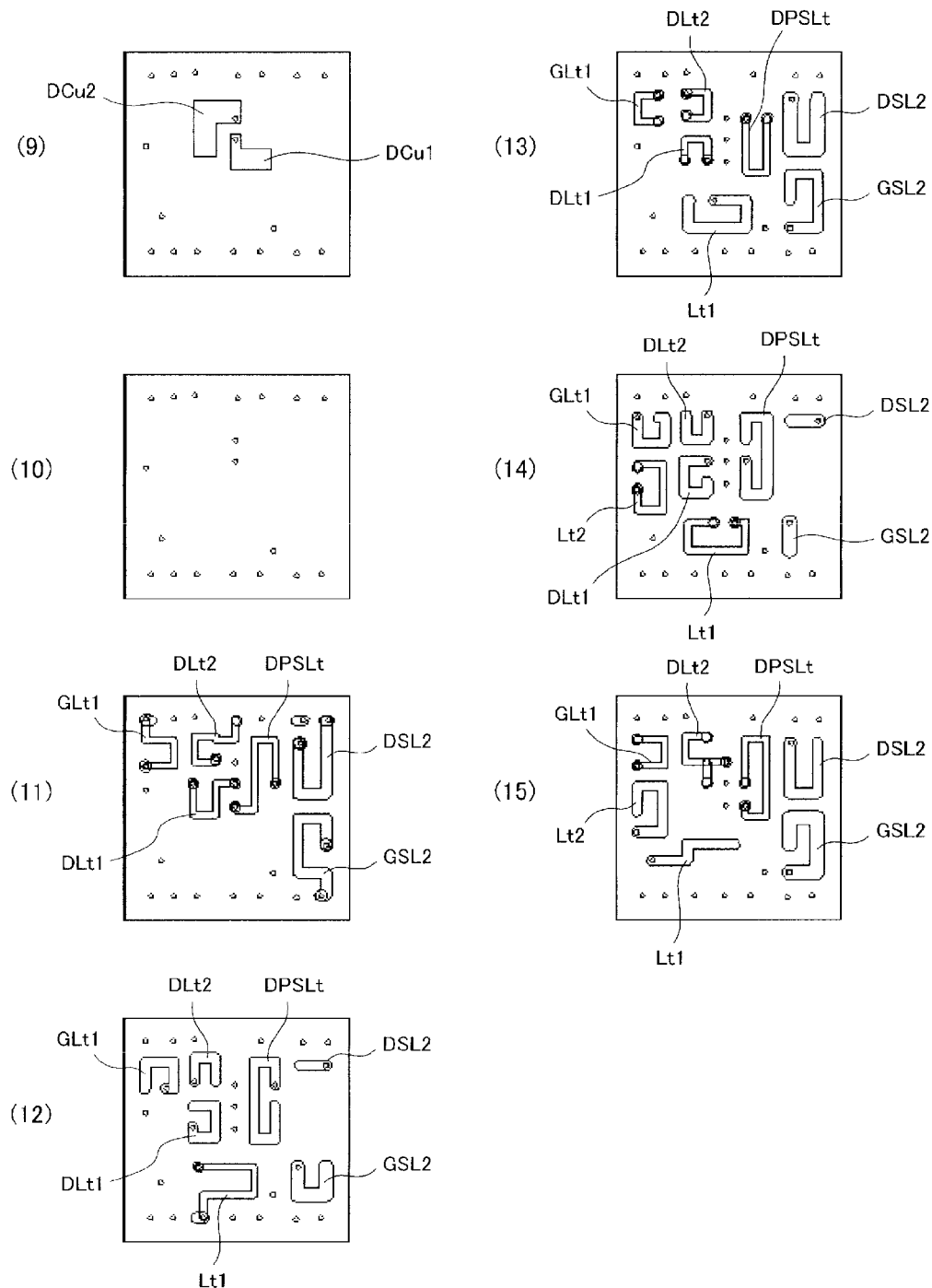
FIG. 5 illustrates a conductor pattern of each layer continued from FIG. 4.
Figure 6:
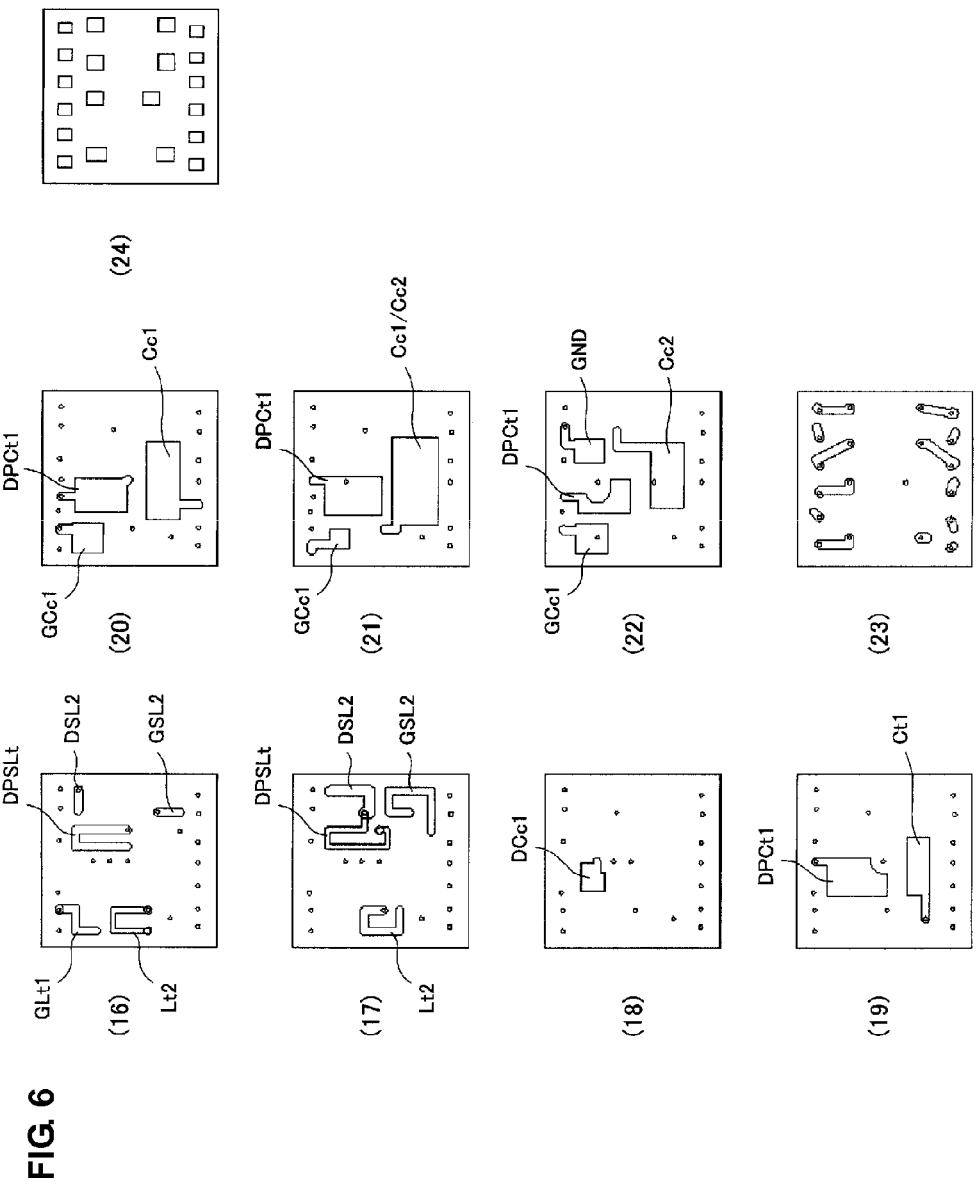
FIG. 6 illustrates a conductor pattern of each layer continued from FIG. 5.

Each of FIGS. 4 to 6 is a bottom view of a conductor pattern on each layer. The illustration (1) in FIG. 4 shows the lowermost layer, and the illustration (24) in FIG. 6 shows the topmost layer. For convenience, the conductor patterns are represented in three drawings, FIGS. 4 to 6. Reference characters of portions in FIGS. 4 to 6 correspond to those in the circuit diagram illustrated in FIG. 3. In these drawings, GND denotes a ground electrode. In the illustration (1) in FIG. 4, G denotes a ground terminal. The reference characters of the other terminals correspond to those in the circuit diagram illustrated in FIG. 3.

Figure 7:
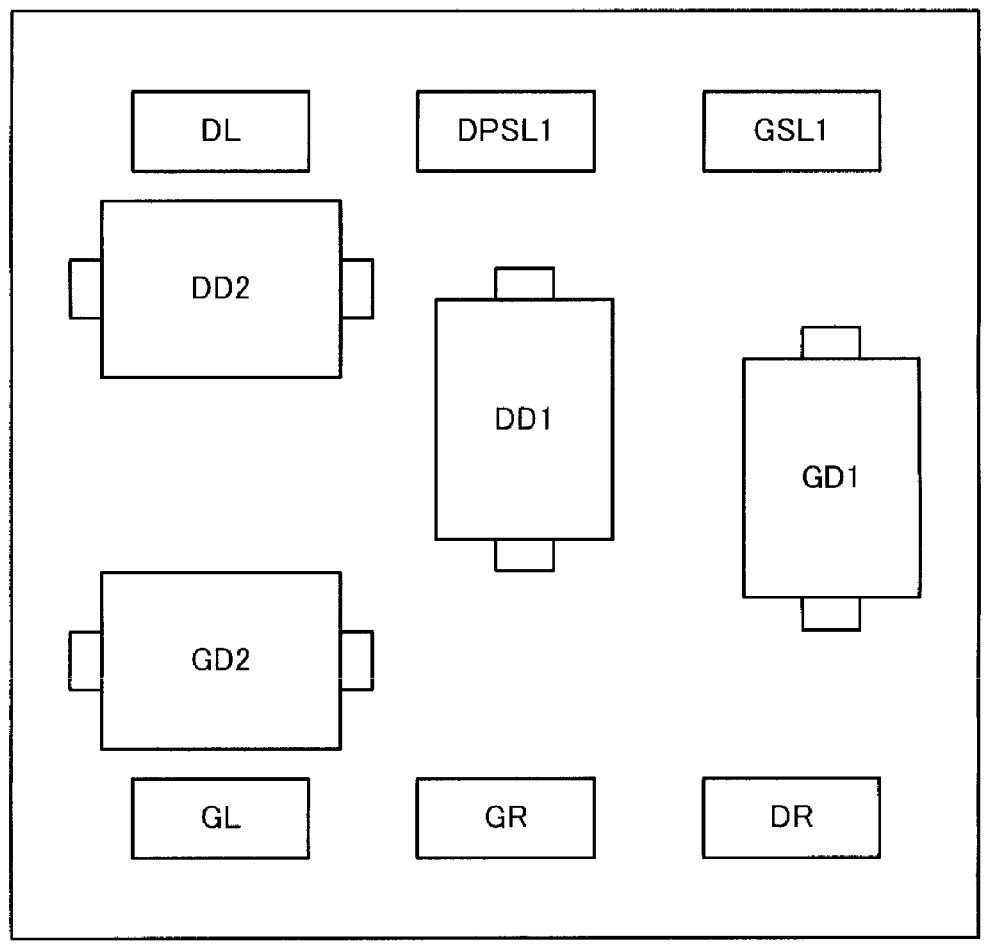
FIG. 7 illustrates a configuration of a topmost layer of the laminated structure of the composite high-frequency component according to a preferred embodiment of the present invention.

FIG. 7 is a top view of the laminated structure when chip components are mounted on the topmost surface thereof. The reference characters in the drawing correspond to those in the circuit diagram of FIG. 3.

As described above, the composite high-frequency component according to the second preferred embodiment of the present invention enables a reduction in voltage and current consumption.

Third Preferred Embodiment

Figure 8:
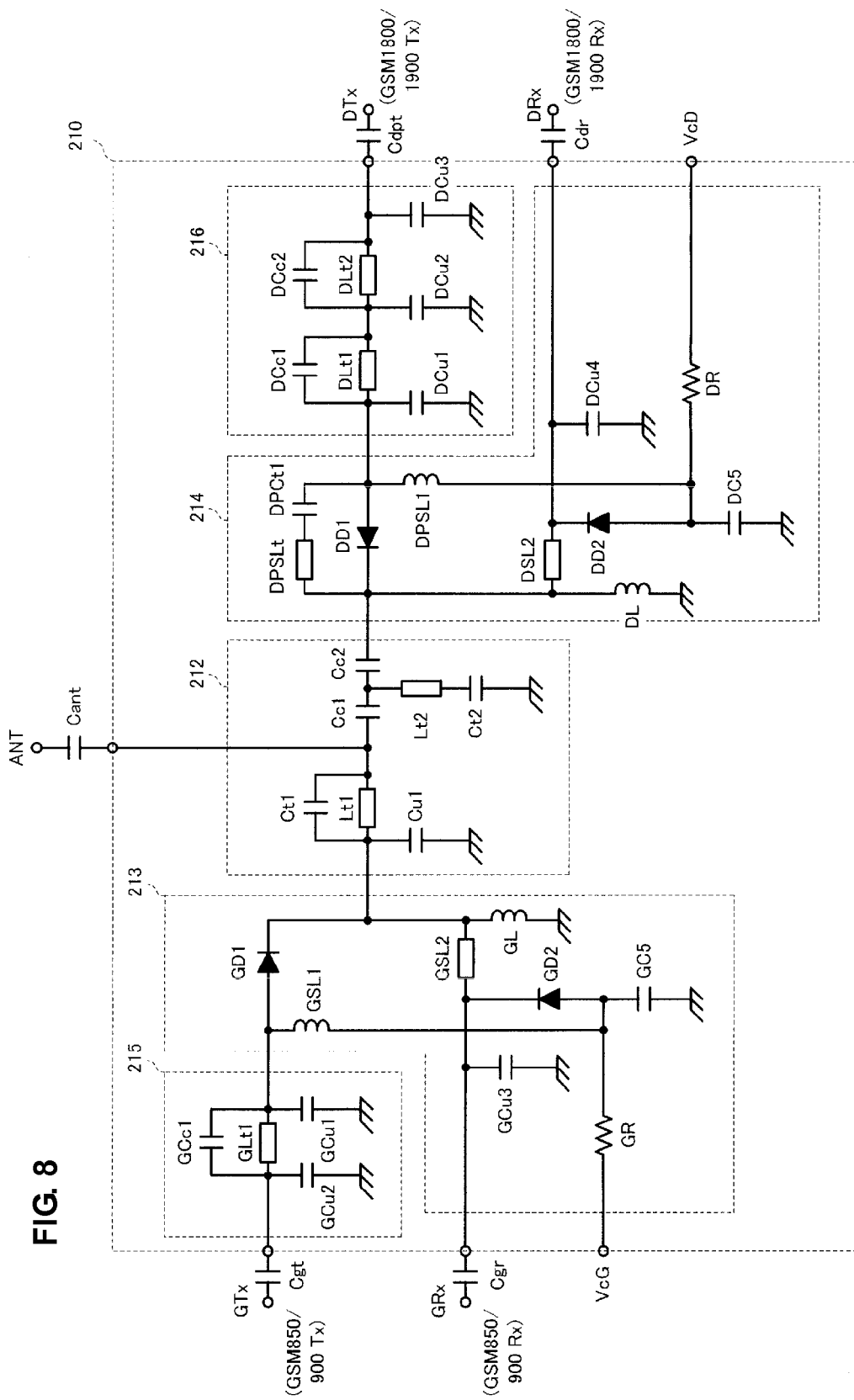
FIG. 8 is a circuit diagram of a composite high-frequency component according to a third preferred embodiment of the present invention.

A composite high-frequency component according to a third preferred embodiment of the present invention will be described with reference to FIG. 8.

The composite high-frequency component 210 differs from the composite high-frequency component illustrated in FIG. 3 in the arrangement of each of the transmission/reception selection switches 213 and 214. A diplexer 212 is substantially the same as the diplexer 202 illustrated in FIG. 3. Filters 215 and 216 are also substantially the same as the filters 205 and 206 illustrated in FIG. 3.

The transmission/reception selection switch 213 for the GSM850/900 system includes a first diode GD1 arranged in series with a transmission signal line and a second diode GD2 arranged in shunt with a reception signal line. Unlike the transmission/reception selection switch 203 illustrated in FIG. 3, a first end of an inductor GL is connected to a node of the cathode of the first diode GD1 and a strip line GSL2, and a second end of the inductor GL is grounded.

When a positive voltage is applied to a control terminal VcG, a direct current flows through, in order, the control terminal VcG, a resistor GR, an inductor GSL1, the first diode GD1, and the inductor GL defining a first current route. A direct current also flows through, in order, the control terminal VcG, the resistor GR, the second diode GD2, the strip line GSL2, and the inductor GL defining a second current route. As described above, although changing the location of the inductor GL causes the first and second current routes to differ from that illustrated in FIG. 3, the control voltage is similarly applied to the two diodes GD1 and GD2 in parallel.

As described above, the inductor GL is provided between the ground and the node of the diplexer 212 and the transmission/reception selection switch 213. Therefore, even if a surge voltage, such as static electricity, is input from the antenna terminal, since the static electricity or other surge voltages is immediately discharged to the ground via the inductor GL, a receiving circuit or a transmitting circuit connected to the transmission/reception selection switch 213 is protected from the static electricity and other surge voltages.

In addition, in the transmission/reception selection switch 214, unlike the transmission/reception selection switch 204 illustrated in FIG. 3, a first end of an inductor DL is connected to a node of the cathode of a diode DD1 and a strip line DSL2, and a second end of the inductor DL is grounded. Thus, a direct current flows through, in order, a control terminal VcD, a resistor DR, an inductor DPSL1, the diode DD1, and the inductor DL defining a first current route. A direct current also flows through, in order, the control terminal VcD, the resistor DR, a diode DD2, the strip line DSL2, and the inductor DL defining a second current route.

In this manner, both switching between transmission and reception for the GSM850/900 system and switching between transmission and reception for the GSM1800/1900 system can be controlled with low voltage, and the low-voltage composite high-frequency component with low current consumption is obtained.

Fourth Preferred Embodiment

Figure 9:
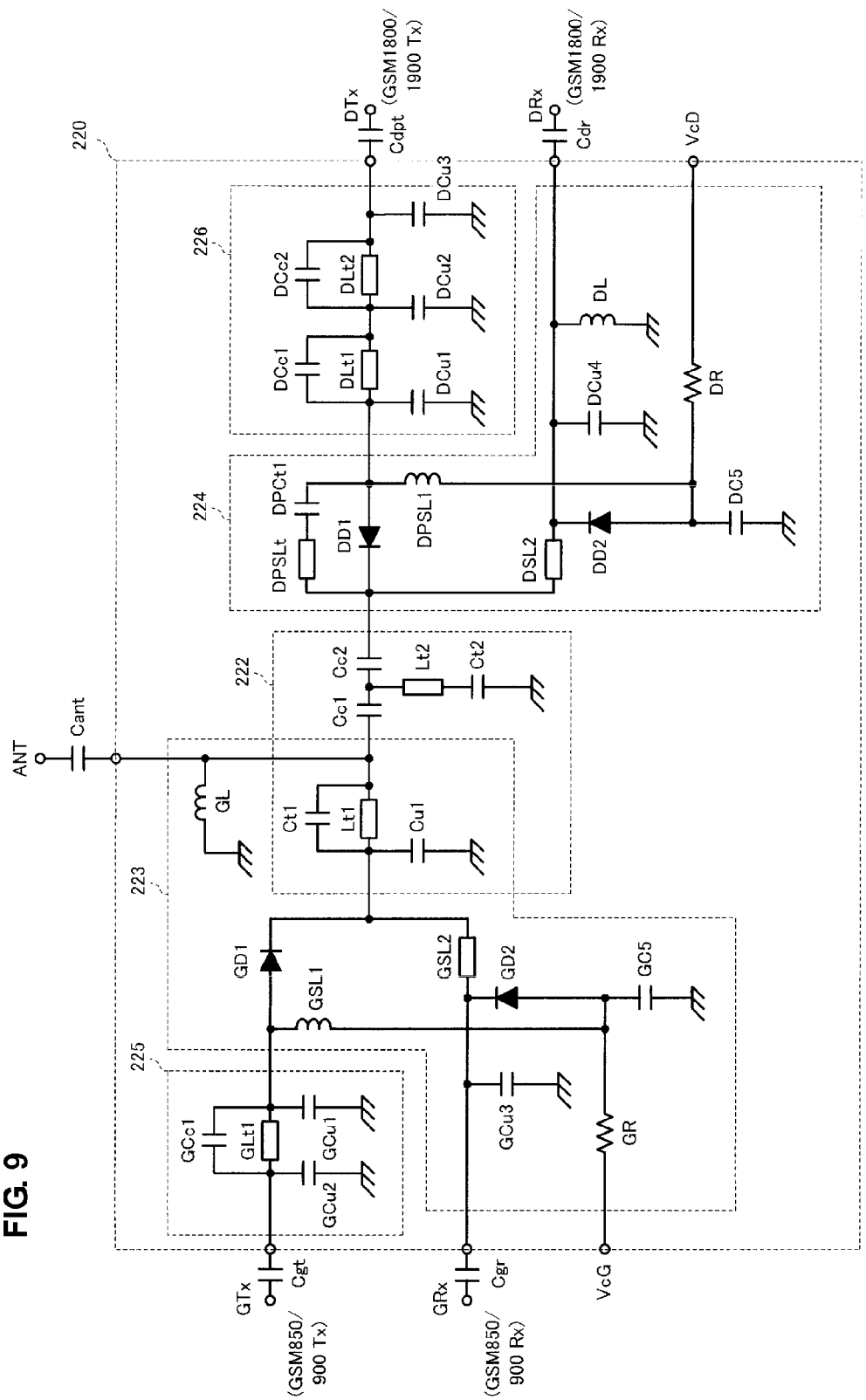
FIG. 9 is a circuit diagram of a composite high-frequency component according to a fourth preferred embodiment of the present invention.

A composite high-frequency component according to a fourth preferred embodiment of the present invention will be described with reference to FIG. 9.

The composite high-frequency component 220 differs from the composite high-frequency component illustrated in FIG. 3 in the arrangement of a transmission/reception selection switch 223, i.e., the connected location of an inductor GL into which direct currents that have passed through two diodes GD1 and GD2 flow in common, i.e., resultant current flows. In this preferred embodiment of the present invention, the inductor GL is connected to a shared signal input/output portion of a diplexer 222. When a positive voltage is applied to a control terminal VcG, a direct current flows through, in order, the control terminal VcG, a resistor GR, an inductor GSL1, a first diode GD1, a strip line Lt1, and the inductor GL defining a first current route). A direct current also flows through, in order, the control terminal VcG, the resistor GR, the second diode GD2, a strip line GSL2, the strip line Lt1, and the inductor GL defining a second current route.

The diplexer 222 is substantially the same as the diplexer 202 illustrated in FIG. 3, and a transmission/reception selection switch 224, and filters 225 and 226 for the GSM1800/1900 system are substantially the same as the transmission/reception selection switch 204, and the filters 205 and 206 illustrated in FIG. 3, respectively.

In this manner, when the current route of the passage of the direct current in the diplexer 222 is shared by the transmission/reception selection switch, similar advantages are obtained.

By providing the inductor GL adjacent to the antenna terminal, even if a surge voltage, such as static electricity, is input from the antenna terminal, because the static electricity or other surge voltage is immediately discharged to the ground via the inductor GL, a receiving circuit or a transmitting circuit connected to the transmission/reception selection switch 223 is protected from the static electricity or other surge voltages.

Fifth Preferred Embodiment

A composite high-frequency component according to a fifth preferred embodiment of the present invention will be described with reference to FIG. 10.

In the preferred embodiment illustrated in FIG. 3, the single resistor GR through which currents from the control terminal VcG flow in common is used. The composite high-frequency component 230 illustrated in FIG. 10 includes a resistor GR1 arranged in a current route in which a direct current passes through a first diode GD1 and a resistor GR2 arranged in a current route in which a direct current passes through a second diode GD2.

When a positive voltage is applied to a control terminal VcG, a direct current flows through, in order, the control terminal VcG, the resistor GR1, an inductor GSL1, the first diode GD1, a strip line GSL2, and an inductor GL defining a first current route. In addition, a direct current flows through, in order, the control terminal VcG, the resistor GR2, the second diode GD2, and the inductor GL defining a second current route.

Similarly, in a transmission/reception selection switch 234 for the GSM1800/1900 system, the current route of a direct current passing through a diode DD1 and that passing through a diode DD2 are provided with resistors DR1 and DR2, respectively.

As described above, a current-limiting resistor provided for each diode increases a voltage imposed on each diode.

Sixth Preferred Embodiment

Figure 11:
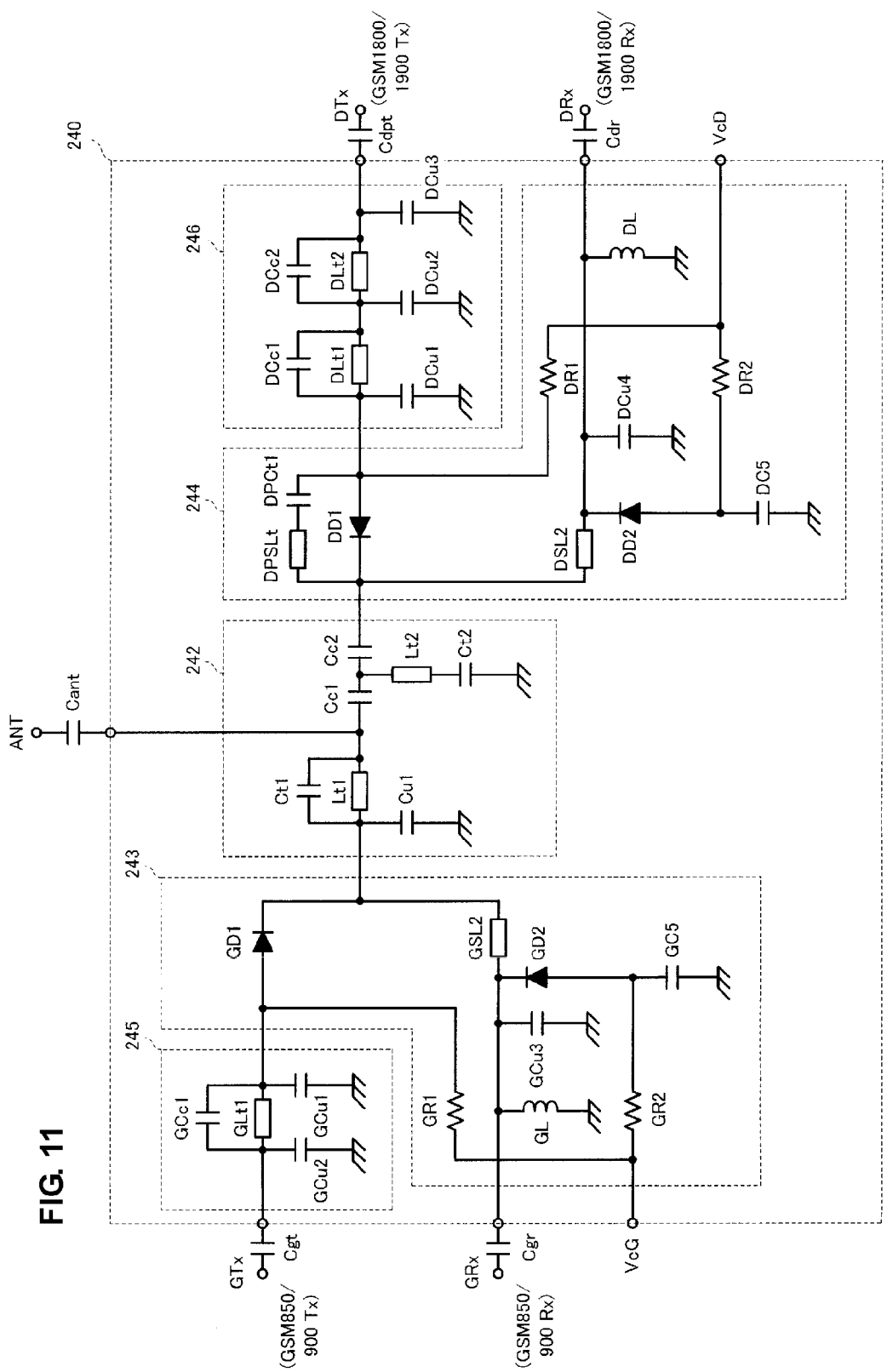
FIG. 11 is a circuit diagram of a composite high-frequency component according to a sixth preferred embodiment of the present invention.

A composite high-frequency component according to a sixth preferred embodiment of the present invention will be described with reference to FIG. 11.

Figure 10:
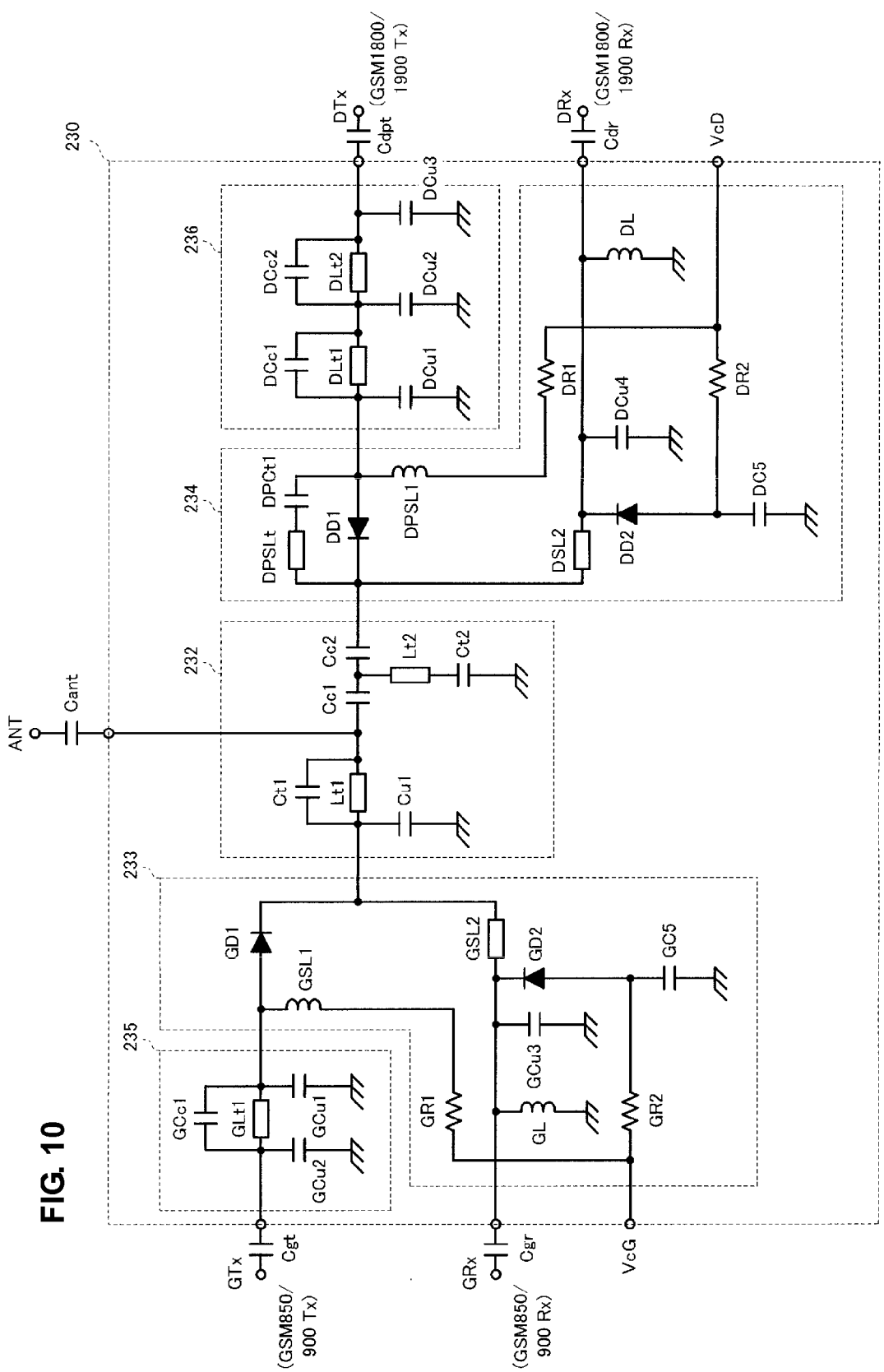
FIG. 10 is a circuit diagram of a composite high-frequency component according to a fifth preferred embodiment of the present invention.

The composite high-frequency component 240 differs from that illustrated in FIG. 10 in the arrangement of each of transmission/reception selection switches 243 and 244. In the transmission/reception selection switches 233 and 234 illustrated in FIG. 10, the current route of a direct current passing through the diode GD1 and that passing through the diode DD1 are provided with the inductors GSL1 and DPSL1, respectively. In the preferred embodiment of the present invention illustrated in FIG. 11, the inductors GSL1 and DPSL1 are omitted. In this manner, the current routes of direct currents passing through diodes GD1 and DD1 arranged in series with the respective signal lines are provided with resistors GR1 and DR1, so as to suppress or prevent unnecessary transmission of a transmission signal to the control terminal side. By providing the resistors GR1 and DR1, a higher voltage can be applied to the diodes GD1 and DD1. In the preferred embodiment illustrated in FIG. 10, the inductors GSL1 and DPSL1 prevent leakage of high frequencies as well as perform the function of passing a current. In the preferred embodiment illustrated in FIG. 11, which includes only the resistors GR1 and DR1, these resistors perform substantially the same functions as those of the inductors GSL1 and DPSL1.

Seventh Preferred Embodiment

A composite high-frequency component according to a seventh preferred embodiment of the invention will be described with reference to FIG. 12.

The composite high-frequency component 250 differs from the composite high-frequency component illustrated in FIG. 3 in the arrangement of each of a diplexer 252 and a transmission/reception selection switch 253 for the GSM850/900 system. In the preferred embodiment illustrated in FIG. 12, a filter for the GSM850/900 system in the diplexer 252 is defined by capacitors Ct1, Cu1, GCc1, and GCu1 and strip lines Lt1 and GLt1. That is, a two-stage low-pass filter is provided, and the advantage of cutting off a high-frequency range (harmonic content) greater than the frequency band used in the GSM850/900 communication system is improved. Accordingly, a circuit corresponding to the filter 205 illustrated in FIG. 3 is omitted.

The transmission/reception selection switch 253 for the GSM850/900 system is substantially the same as the transmission/reception selection switch 203 illustrated in FIG. 3. However, the transmission/reception selector switch 253 includes a capacitor GCu2 arranged to match impedance to a transmission terminal GTx as a result of the omission of a circuit corresponding to the filter 205 illustrated in FIG. 3.

As described above, by arranging the filter that cuts off frequency components other than the frequency band used in the GSM850/900 communication system at a side adjacent to the transmission-signal output portion of the transmission/reception selection switch 253 suppresses or prevents a harmonic-distortion content caused by the non-linearity of a diode GD1. Accordingly, a control voltage to be applied to the diode GD1, i.e., a control voltage to be applied to a control terminal VcG, can be set at a lower level.

Eighth Preferred Embodiment

Figure 13:
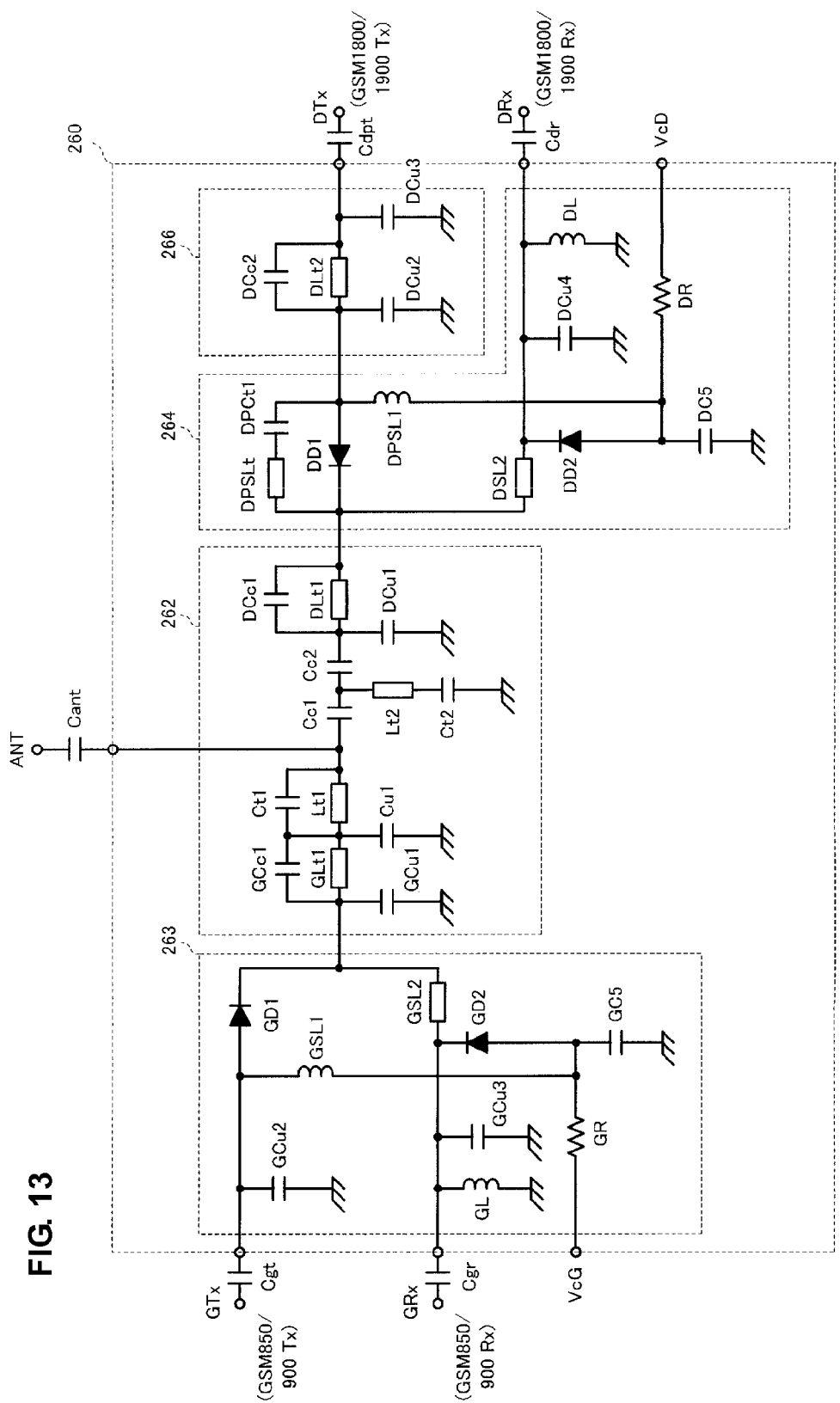
FIG. 13 is a circuit diagram of a composite high-frequency component according to an eighth preferred embodiment of the present invention.

A composite high-frequency component according to an eighth preferred embodiment of the present invention will be described with reference to FIG. 13.

Figure 12:
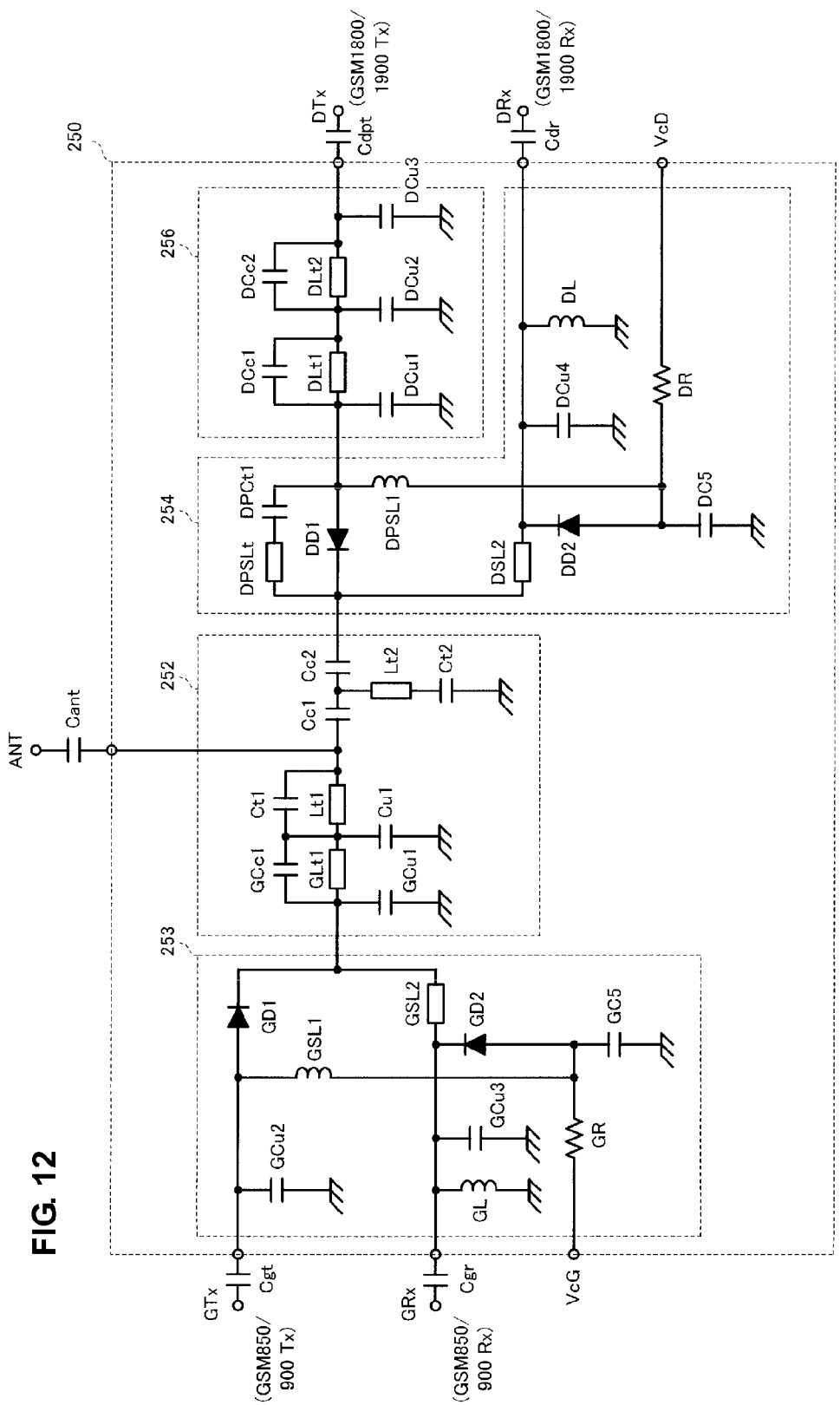
FIG. 12 is a circuit diagram of a composite high-frequency component according to a seventh preferred embodiment of the present invention.

The composite high-frequency component 260 differs from that illustrated in FIG. 12 in the arrangement of each of a diplexer 262 and a filter 266. In the preferred embodiment illustrated in FIG. 13, a low-pass filter arranged to suppress spurious responses of the GSM1800/1900 system side is provided ahead of a transmission/reception selection switch 264.

As described above, by arranging the filter that cuts off a high-frequency range (harmonic content) other than the frequency band used in the GSM1800/1900 communication system to a side adjacent to an output portion of the transmission/reception selection switch 264 for switching between transmission signals of the GSM1800/1900 system suppresses or prevents a harmonic-distortion content caused by the nonlinearity of a diode DD1. Accordingly, a control voltage to be applied to the diode DD1, i.e., a control voltage to be applied to a control terminal VcD, can be set at a lower level.

Ninth Preferred Embodiment

Figure 14:
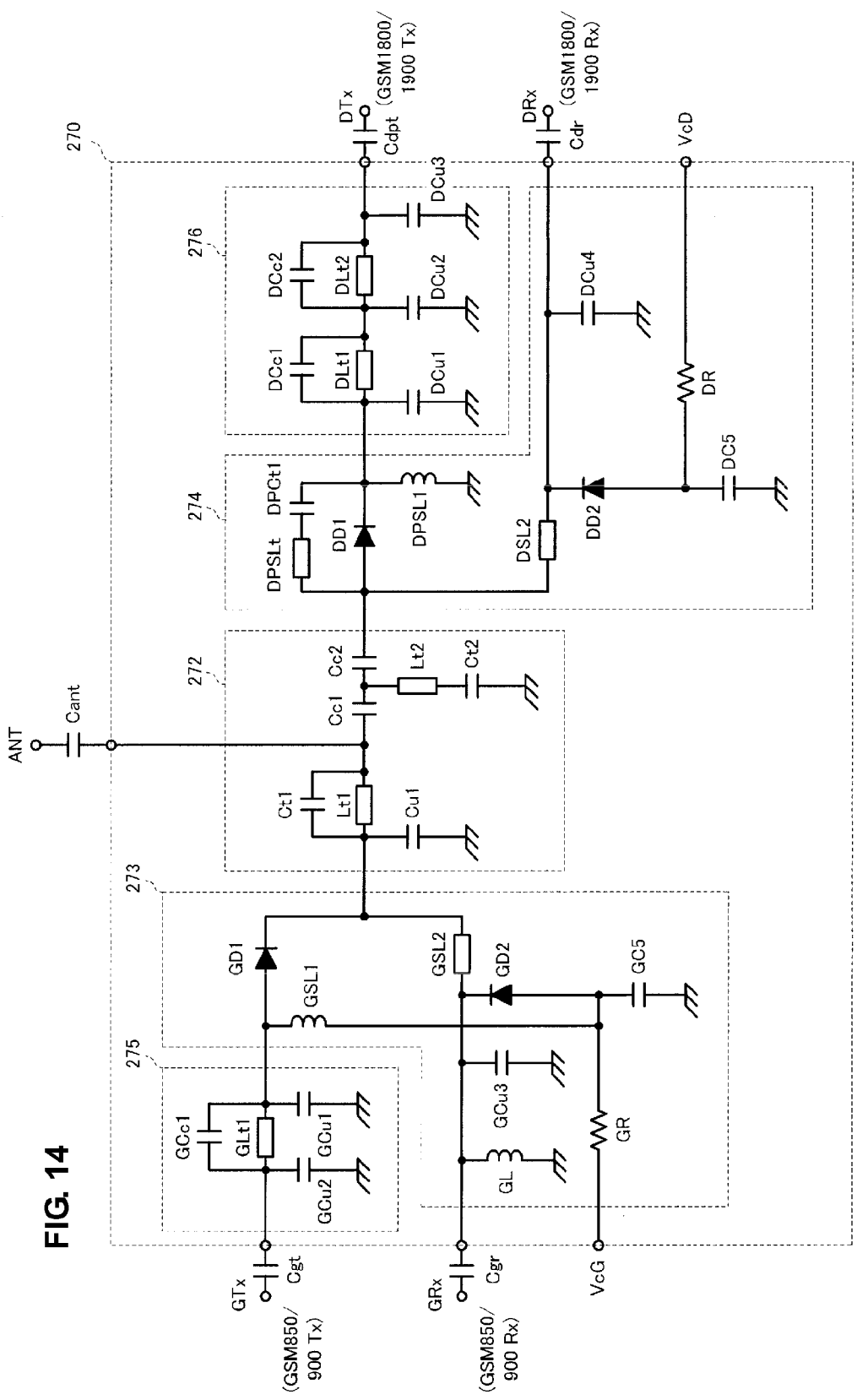
FIG. 14 is a circuit diagram of a composite high-frequency component according to a ninth preferred embodiment of the present invention.

A composite high-frequency component according to a ninth preferred embodiment of the present invention will be described with reference to FIG. 14.

The composite high-frequency component 270 differs from the composite high-frequency component illustrated in FIG. 3 in the arrangement of a transmission/reception selection switch 274 for the GSM1800/1900 system. In the preferred embodiment illustrated in FIG. 3, in each of the transmission/reception selection switches for the GSM850/900 system and the GSM1800/1900 system, a control voltage is applied to the two diodes in parallel. In the preferred embodiment illustrated in FIG. 14, in the transmission/reception selection switch 274 for the GSM1800/1900 system, a control voltage is applied to two diodes DD1 and DD2 in series. That is, the transmission/reception selection switch 274 for the GSM1800/1900 system has a similar circuit arrangement to that in the known art.

In this preferred embodiment of the present invention, when a predetermined positive voltage is applied to a control terminal VcD, the two diodes DD1 and DD2 are both turned ON, and a direct current flows through, in order, the control terminal VcD, a resistor DR, the diode DD2, a strip line DSL2, the diode DD1, and an inductor DPSL1.

With a dual-band switchplexer, in a high-frequency switch that switches between transmission/reception signals of a communication system whose signal power is relatively low, a problem of harmonic distortion occurring with a decrease in control voltage applied to the diodes increases. Because of this, as illustrated in FIG. 14, a control voltage may be applied to the two diodes in parallel only in a transmission/reception selection switch 273 for the GSM850/900 system, which is a communication system whose signal power is relatively high.

Tenth Preferred Embodiment

A composite high-frequency component according to a tenth preferred embodiment of the present invention will be described with reference to FIG. 15.

In the second to ninth preferred embodiments, a dual-band switchplexer includes a transmission-signal input terminal and a reception-signal output terminal for the GSM850/900 system and a transmission-signal input terminal and a reception-signal output terminal for the GSM1800/1900 system. The composite high-frequency component 280 illustrated in FIG. 15 is used as a triple-band switchplexer in which separate reception-signal output terminals are used for the GSM1800 system and the GSM1900 system. A difference from the circuitry illustrated in FIG. 3 is that a reception-signal high-frequency switch 287 that switches a reception signal of the GSM1800/1900 system between a reception signal of the GSM1800 system and a reception signal for the GSM1900 system is included.

The reception-signal high-frequency switch 287 includes a first diode PD1 arranged in series with a reception signal line for the GSM1900 system and a second diode PD2 arranged in shunt with a reception signal line for the GSM1800 system. When a predetermined positive voltage is applied to a control terminal VcDR, the diodes PD1 and PD2 are both turned ON, and a direct current flows through, in order, the control terminal VcDR, a resistor PR, the second diode PD2, a strip line PSL2, the first diode PD1, and an inductor PSL1. In this manner, a reception signal output from a transmission/reception selection switch 284 for the GSM1800/1900 system is switched by the reception-signal high-frequency switch 287 between a reception signal of the GSM1900 system and a reception signal of the GSM1800 system.

A capacitor DC6 to block a direct current is arranged between the transmission/reception selection switch 284 and the reception-signal high-frequency switch 287.

Eleventh Preferred Embodiment

Figure 16:
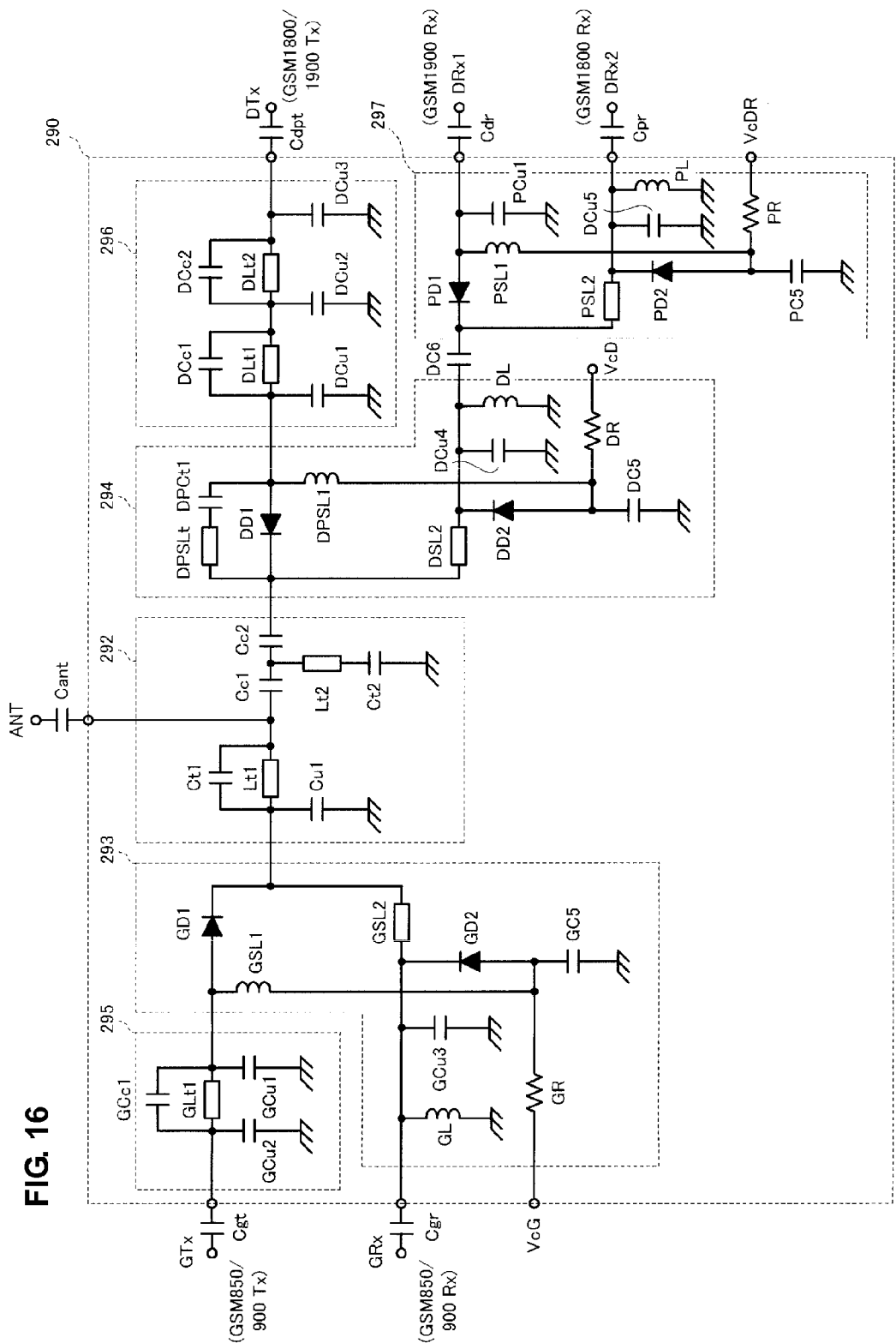
FIG. 16 is a circuit diagram of a composite high-frequency component according to an eleventh preferred embodiment of the present invention.

A composite high-frequency component according to an eleventh preferred embodiment of the present invention will be described with reference to FIG. 16.

Figure 15:
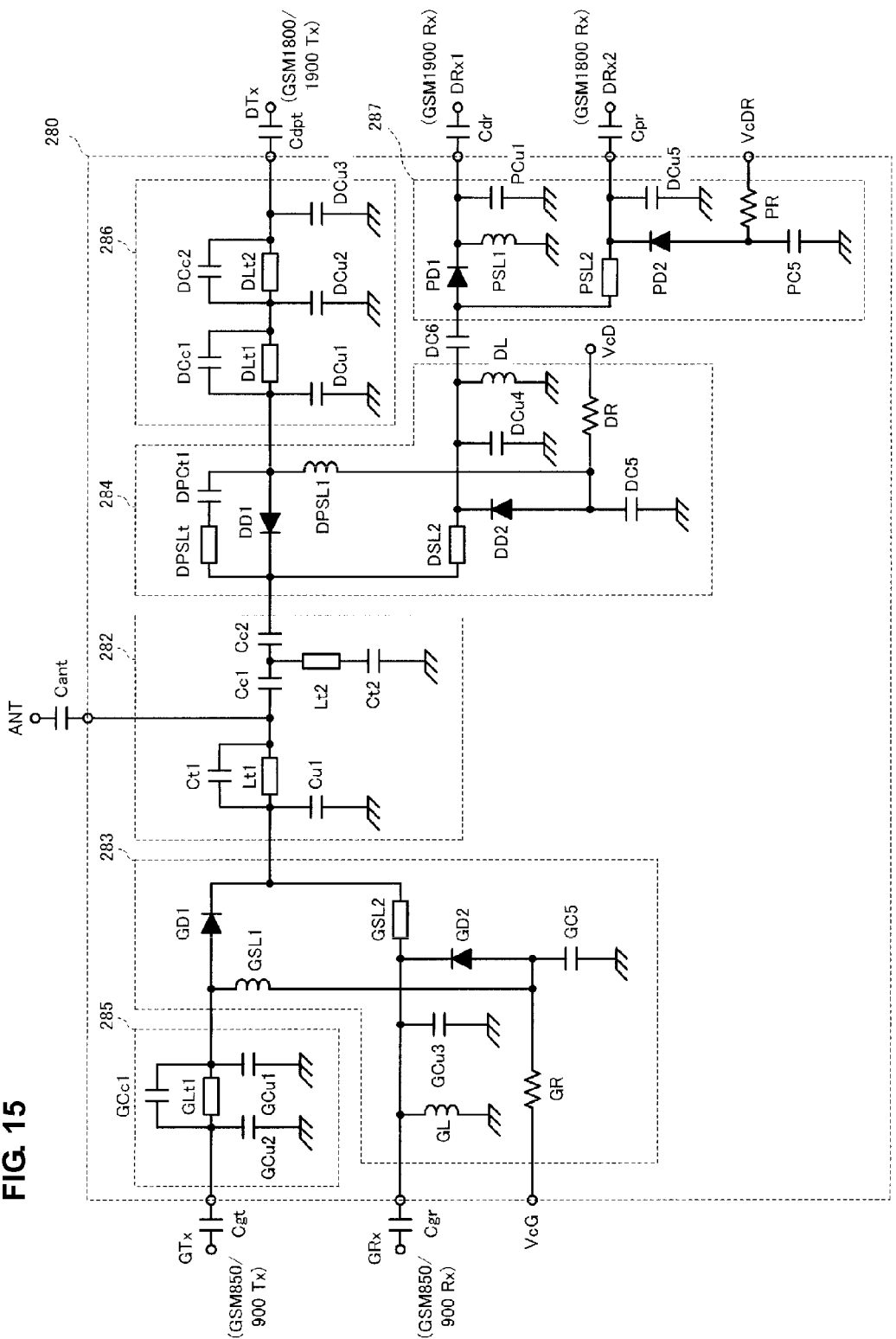
FIG. 15 is a circuit diagram of a composite high-frequency component according to a tenth preferred embodiment of the present invention.

The composite high-frequency component 290 differs from the circuitry illustrated in FIG. 15 in the arrangement of a reception-signal high-frequency switch 297 for the GSM1800/1900 system. The reception-signal high-frequency switch 297 includes a first diode PD1 arranged in series with a reception signal line for the GSM1900 system and a second diode PD2 arranged in shunt with a reception signal line of the GSM1800 system. A first current route of a direct current passing through the diode PD1 and a second current route of a direct current passing through the diode PD2, the direct currents flowing when a predetermined positive voltage is applied to a control terminal VcDR, are connected in parallel. That is, when a predetermined positive voltage is applied to the control terminal VcDR, a current flows through, in order, the control terminal VcDR, a resistor PR, an inductor PSL1, the first diode PD1, a strip line PSL2, and an inductor PL defining a first current route. In addition, a current flows through, in order, the control terminal VcDR, the resistor PR, the second diode PD2, and the inductor PL defining a second current route.

As described above, a control voltage is applied to the two diodes PD1 and PD2 in parallel in the reception-signal high-frequency switch 297. Therefore, the control voltage can be reduced.

Twelfth Preferred Embodiment

A composite high-frequency component according to a twelfth preferred embodiment of the present invention will be described with reference to FIG. 17.

The composite high-frequency component 300 is used as a quad-band switchplexer by including a reception-signal high-frequency switch 308 in the GSM850/900 system side. The reception-signal high-frequency switch for the GSM1800/1900 system is substantially the same as that illustrated in FIG. 15.

When a predetermined positive voltage is applied to a control terminal VcGR, two diodes AD1 and AD2 are both turned ON, and a direct current flows through, in order, the control terminal VcGR, a resistor AR, the diode AD2, a strip line ASL2, the diode AD1, and an inductor ASL1. In this manner, the composite high-frequency component 300 can be used as a quad-band switchplexer by including the reception-signal high-frequency switch 308 in the GSM850/900 system side.

Thirteenth Preferred Embodiment

Figure 18:
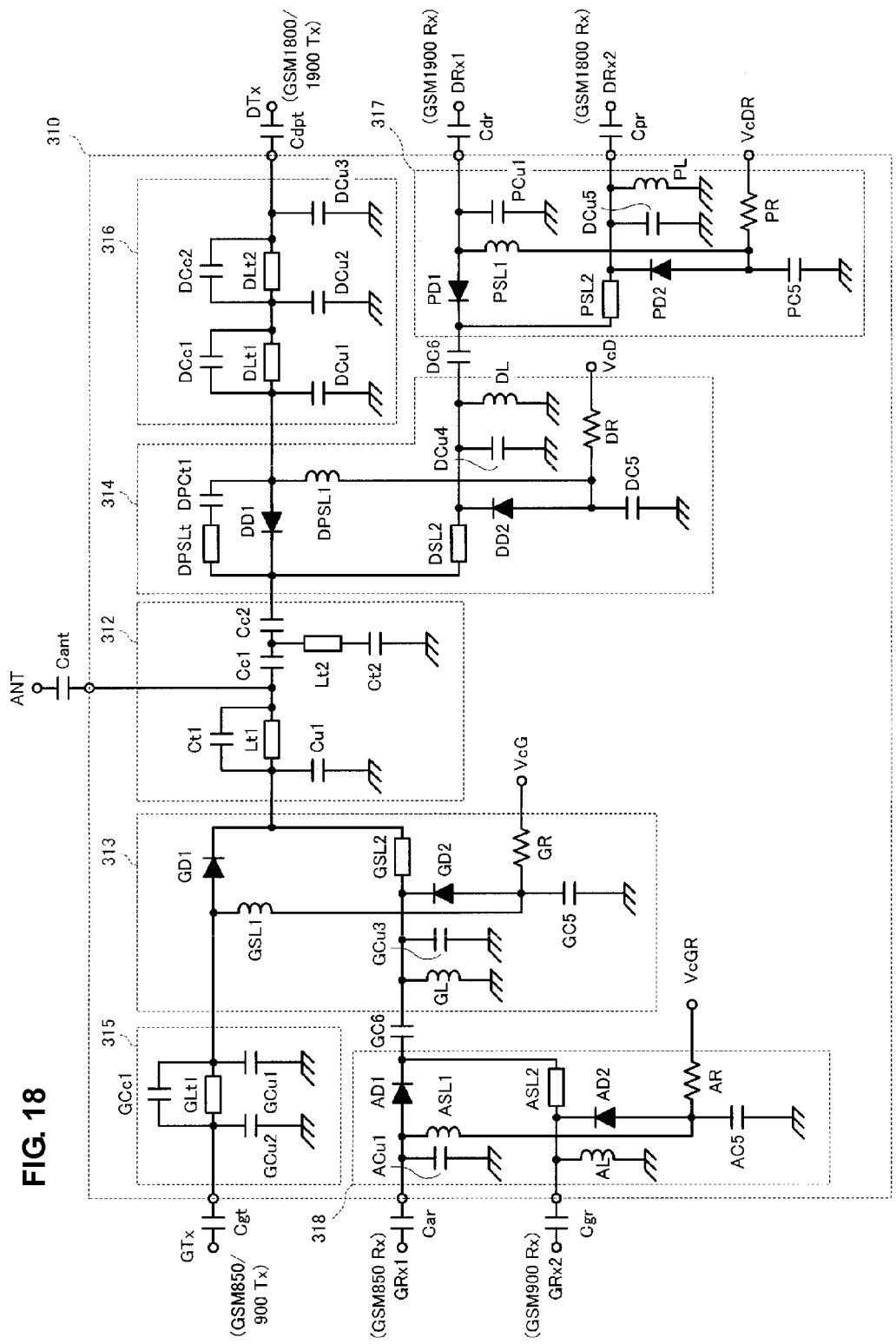
FIG. 18 is a circuit diagram of a composite high-frequency component according to a thirteenth preferred embodiment of the present invention.

A composite high-frequency component according to a thirteenth preferred embodiment of the present invention will be described with reference to FIG. 18.

Figure 17:
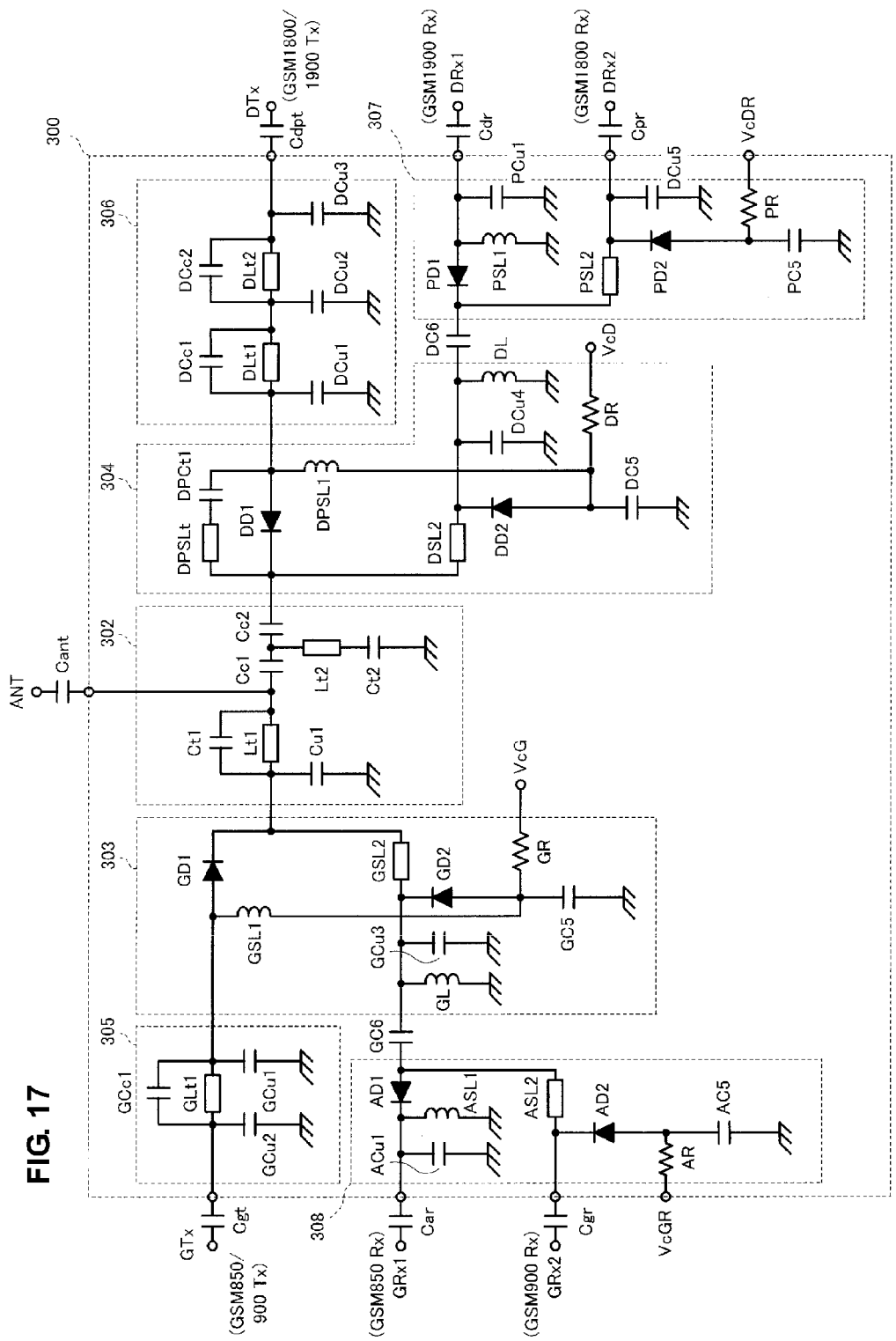
FIG. 17 is a circuit diagram of a composite high-frequency component according to a twelfth preferred embodiment of the present invention.

The composite high-frequency component 310 differs from the circuitry illustrated in FIG. 17 in the arrangement of a reception-signal high-frequency switch 318 for the GSM850/900 system. A reception-signal high-frequency switch 317 for the GSM1800/1900 system has an arrangement substantially the same as that of the reception-signal high-frequency switch 297 illustrated in FIG. 16.

In this preferred embodiment, a control voltage is applied to two diodes AD1 and AD2 in parallel in the reception-signal high-frequency switch 318. That is, a first current route of a direct current passing through the diode AD1 and a second current route of a direct current passing through the diode AD2, the direct currents flowing when a predetermined positive voltage is applied to a control terminal VcGR, are connected in parallel. When a predetermined positive voltage is applied to the control terminal VcGR, a current flows through, in order, the control terminal VcGR, a resistor AR, an inductor ASL1, the diode AD1, a strip line ASL2, and an inductor AL defining a first current route. In addition, a current flows through, in order, the control terminal VcGR, the resistor AR, the diode AD2, and the inductor AL defining a second current route.

As described above, a control voltage is applied to the two diodes AD1 and AD2 in parallel in the reception-signal high-frequency switch 318. Therefore, the control voltage can be reduced.

While preferred embodiments of the present invention have been described above, it is to be understood that variations and modifications will be apparent to those skilled in the art without departing the scope and spirit of the present invention. The scope of the present invention, therefore, is to be determined solely by the following claims.

What is claimed is:

1. A low-voltage control high-frequency switch comprising:
    a first signal line arranged between a shared signal input/output portion and a first signal input/output portion;
    a second signal line arranged between the shared signal input/output portion and a second signal input/output portion;
    a first current route in which a direct current flows, the first current route including a first diode; and
    a second current route in which a direct current flows, the second current route including a second diode; wherein
    the first and second current routes are connected in parallel at a parallel connection such that directions in which the direct currents flow in the first and second current routes substantially match each other;
    a single common inductor is arranged between a first node of the parallel connection and a ground;
    the first current route and the second current route are commonly connected to the ground by the single common inductor;
    a second node of the parallel connection defines a control-voltage input portion; and
    the first diode is arranged in series with the first signal line, and the second diode is arranged in shunt with the second signal line.

2. The low-voltage control high-frequency switch according to claim 1, wherein each of the first and second current routes is provided with a resistor through which the direct current flows.

3. A composite high-frequency component comprising:
    input/output portions for transmission/reception signals of a plurality of communication systems at different frequency bands; and
    a multiplexer/demultiplexer including an antenna connection portion and arranged to multiplex or demultiplex the transmission/reception signals of the plurality of communication systems; wherein
    a high-frequency switch that switches between a transmission signal and a reception signal is connected between the multiplexer/demultiplexer and each of the input/output portions the plurality of communication systems; and
    at least one of the high-frequency switches is the low-voltage control high-frequency switch according to claim 1.

4. The composite high-frequency component according to claim 3, wherein the low-voltage control high-frequency switch is arranged at least between the multiplexer/demultiplexer and an input/output portion of a communication system whose signal power is greatest among the transmission/reception signals of the plurality of communication systems.

5. The composite high-frequency component according to claim 3, further comprising a strip line arranged between the antenna connection portion of the multiplexer/demultiplexer and the low-voltage control high-frequency switch, wherein a first end of the single common inductor of the low-voltage control high-frequency switch is connected to a node of the multiplexer/demultiplexer and the low-voltage control high-frequency switch, and a second end of the single common inductor is grounded.

6. The composite high-frequency component according to claim 3, wherein the multiplexer/demultiplexer is partially shared by the single common inductor of the low-voltage control high-frequency switch and the first and second current routes.

7. The composite high-frequency component according to claim 3, further comprising a filter arranged between the low-voltage control high-frequency switch and the multiplexer/demultiplexer and arranged to cut off frequency components other than a frequency band used in a communication system selected by the low-voltage control high-frequency switch.

8. The composite high-frequency component according to claim 3, wherein
the plurality of communication systems includes at least three communication systems including two communication systems having adjacent frequency bands;
the multiplexer/demultiplexer multiplexes or demultiplexes a transmission/reception signal of two communication systems having adjacent frequency bands and a transmission/reception signal of the other communication systems among transmission/reception signals of the at least three communication systems; and
a reception-signal high-frequency switch that switches between reception signals of the two communication systems having adjacent frequency bands comprises the low-voltage control high-frequency switch according to claim 1.

9. The composite high-frequency component according to claim 3, wherein
the plurality of communication systems includes a first group including two communication systems having adjacent frequency bands and a second group including two communication systems having adjacent frequency bands;
the multiplexer/demultiplexer multiplexes or demultiplexes a transmission/reception signal of the first group and a transmission/reception signal of the second group; and
at least one of a first reception-signal high-frequency switch that switches between reception signals of the two communication systems of the first group and a second reception-signal high-frequency switch that switches between reception signals of the two communication systems of the second group comprises the low-voltage control high-frequency switch according to claim 1.

10. A low-voltage control high-frequency switch comprising:
a first signal line arranged between a shared signal input/output portion and a first signal input/output portion;
a second signal line arranged between the shared signal input/output portion and a second signal input/output portion;
a first diode arranged in series with the first signal line;
a second diode arranged in shunt with the second signal line;
a first current route in which a direct current flows, the first current route including the first diode;
a second current route in which a direct current flows, the second current route including the second diode; and
a strip line arranged in the second signal line, between the first diode and the second diode, and between the shared signal input/output portion and the second diode; wherein
the first and second current routes are connected in parallel at a parallel connection such that directions in which the direct currents flow in the first and second current routes substantially match each other;
a single common inductor is arranged closer to the second signal input/output portion than to the strip line and between a first node of the parallel connection and a ground, the first node being a node of the second diode and the strip line;
the first current route and the second current route are commonly connected to the ground by the single common inductor; and
a second node of the parallel connection defines a control-voltage input portion.

11. The low-voltage control high-frequency switch according to claim 10, wherein each of the first and second current routes is provided with a resistor through which the direct current flows.

12. A composite high-frequency component comprising:
input/output portions for transmission/reception signals of a plurality of communication systems at different frequency bands; and
a multiplexer/demultiplexer including an antenna connection portion and arranged to multiplex or demultiplex the transmission/reception signals of the plurality of communication systems; wherein
a high-frequency switch that switches between a transmission signal and a reception signal is connected between the multiplexer/demultiplexer and each of the input/output portions the plurality of communication systems; and
at least one of the high-frequency switches is the low-voltage control high-frequency switch according to claim 10.

13. The composite high-frequency component according to claim 12, wherein the low-voltage control high-frequency switch is arranged at least between the multiplexer/demultiplexer and an input/output portion of a communication system whose signal power is greatest among the transmission/reception signals of the plurality of communication systems.

14. The composite high-frequency component according to claim 12, further comprising a strip line arranged between the antenna connection portion of the multiplexer/demultiplexer and the low-voltage control high-frequency switch, wherein a first end of the single common inductor of the low-voltage control high-frequency switch is connected to a node of the multiplexer/demultiplexer and the low-voltage control high-frequency switch, and a second end of the single common inductor is grounded.

15. The composite high-frequency component according to claim 12, wherein the multiplexer/demultiplexer is partially shared by the single common inductor of the low-voltage control high-frequency switch and the first and second current routes.

16. The composite high-frequency component according to claim 12, further comprising a filter arranged between the low-voltage control high-frequency switch and the multiplexer/demultiplexer and arranged to cut off frequency components other than a frequency band used in a communication system selected by the low-voltage control high-frequency switch.

17. The composite high-frequency component according to claim 12, wherein
- the plurality of communication systems includes at least three communication systems including two communication systems having adjacent frequency bands;
- the multiplexer/demultiplexer multiplexes or demultiplexes a transmission/reception signal of two communication systems having adjacent frequency bands and a transmission/reception signal of the other communication systems among transmission/reception signals of the at least three communication systems; and
- a reception-signal high-frequency switch that switches between reception signals of the two communication systems having adjacent frequency bands comprises the low-voltage control high-frequency switch according to claim 1.

18. The composite high-frequency component according to claim 12, wherein
- the plurality of communication systems includes a first group including two communication systems having adjacent frequency bands and a second group including two communication systems having adjacent frequency bands;
- the multiplexer/demultiplexer multiplexes or demultiplexes a transmission/reception signal of the first group and a transmission/reception signal of the second group; and
- at least one of a first reception-signal high-frequency switch that switches between reception signals of the two communication systems of the first group and a second reception-signal high-frequency switch that switches between reception signals of the two communication systems of the second group comprises the low-voltage control high-frequency switch according to claim 1.

* * * * *